(12) United States Patent
Shimizu et al.

(10) Patent No.: US 10,761,843 B2
(45) Date of Patent: Sep. 1, 2020

(54) INFORMATION PROCESSING DEVICE AND INFORMATION PROCESSING METHOD

(71) Applicant: FUJITSU LIMITED, Kawasaki-shi, Kanagawa (JP)

(72) Inventors: Takashi Shimizu, Kawasaki (JP); Yasuhiro Watanabe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 76 days.

(21) Appl. No.: 16/046,018

(22) Filed: Jul. 26, 2018

(65) Prior Publication Data
US 2019/0034200 A1    Jan. 31, 2019

(30) Foreign Application Priority Data
Jul. 28, 2017    (JP) ................. 2017-146481

(51) Int. Cl.
| G06F 12/08 | (2016.01) |
| G06F 9/30 | (2018.01) |
| G06F 12/0875 | (2016.01) |
| G06F 12/0811 | (2016.01) |
| G06F 12/0831 | (2016.01) |
| G06F 9/50 | (2006.01) |

(52) U.S. Cl.
CPC ........ *G06F 9/3001* (2013.01); *G06F 9/30043* (2013.01); *G06F 9/50* (2013.01); *G06F 12/0811* (2013.01); *G06F 12/0831* (2013.01); *G06F 12/0875* (2013.01); *G06F 2212/1024* (2013.01); *G06F 2212/452* (2013.01)

(58) Field of Classification Search
CPC ...... G06F 9/3001; G06F 9/50; G06F 9/30043; G06F 12/0831; G06F 12/0811; G06F 12/0875; G06F 2212/1024; G06F 2212/452
See application file for complete search history.

(56) References Cited

U.S. PATENT DOCUMENTS

| 9,645,866 B2 * | 5/2017 | Bourd .................... G06F 9/546 |
| 2012/0075319 A1 * | 3/2012 | Dally .................. G06F 12/0284 345/537 |
| 2018/0136849 A1 | 5/2018 | Shirota et al. |

FOREIGN PATENT DOCUMENTS

WO    2017/010004 A1    1/2017

* cited by examiner

*Primary Examiner* — Hiep T Nguyen
(74) *Attorney, Agent, or Firm* — Fujitsu Patent Center

(57) ABSTRACT

An information processing device includes a first package including a first arithmetic circuit, first cache memory and a transmitting circuit, as well as a second package including a second arithmetic circuit, second cache memory and a receiving circuit. The first arithmetic circuit is configured to provide transfer data to the first cache memory that is destined for the second cache memory. The transmitting circuit is configured to transmit to the receiving circuit an indication of a data transfer of the transfer data and to restrict use of the first cache memory for data other than the transfer data during the data transfer. The receiving circuit is configured to receive the indication of the data transfer, to acquire the transfer data stored in the first cache memory and to store the acquired transfer data in the second cache memory.

13 Claims, 27 Drawing Sheets

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2017-146481, filed on Jul. 28, 2017, the entire contents of which are incorporated herein by reference.

FIELD

The embodiments discussed herein are related to an information processing device and an information processing method.

BACKGROUND

Nowadays, a system is used which executes information processing and communication with a combination of a central processing unit (CPU), a memory, and a hardware circuit such as a field-programmable gate array (FPGA). In such a system, the CPU, the memory, and the circuit such as the FPGA are connected by a transmission line exemplified by a system bus, an interconnect, or a crossbar. Further, the CPU and the FPGA are respectively provided with cache memories, and cache controllers controlling the cache memories maintain the consistency (also referred to as coherency) between the cache memories and the memory and the consistency between the cache memories.

Further, the CPU and the FPGA exchange data with the memory via the cache memories and the transmission line. Further, a graphics processing unit (GPU) may be used as well as or in place of the CPU. The CPU or the GPU will hereinafter be referred to as the arithmetic device. Further, the hardware circuit including, but not limited to, the FPGA and cooperating with the arithmetic device via the transmission line such as the system bus will be referred to as the arithmetic circuit. The arithmetic device and the arithmetic circuit, however, may be collectively referred to as the arithmetic circuits without distinction therebetween. Related art includes International Publication Pamphlet No. WO 2017/010004.

In the above-described system, a plurality of arithmetic circuits therein traditionally exchange information via the memory. When the plurality of arithmetic circuits connected to the transmission line such as the system bus exchange information via the memory, however, a memory band for another component of the system, such as the arithmetic device, for example, to access the memory is consumed, which may degrade the performance of the system.

An object of the embodiments discussed herein is therefore to enable a system including a memory and a plurality of arithmetic circuits to exchange information between the arithmetic circuits while suppressing the deterioration in the performance of the system including the performance of the memory.

SUMMARY

According to an aspect of the invention, an information processing device includes a first arithmetic package including a first arithmetic circuit, and a second arithmetic circuit, as well as a second arithmetic package coupled to the first arithmetic unit and including a third arithmetic circuit, and a fourth arithmetic circuit. The first arithmetic package also includes a first cache memory configured to hold data input to and output from the second arithmetic circuit in accordance with a procedure of maintaining consistency between the data input to and output from the second arithmetic circuit and data stored in a circuit other than the second arithmetic circuit. The first arithmetic package also includes a transmitting circuit configured to transmit, to the second arithmetic package, information indicating start of transmission of transmission data from the second arithmetic circuit to the fourth arithmetic circuit, and a cache managing circuit configured to write the transmission data to the first cache memory and to restrict use of the first cache memory by data other than the transmission data. The second arithmetic package further includes a second cache memory configured to hold data input to and output from the fourth arithmetic circuit in accordance with a procedure of maintaining consistency between the data input to and output from the fourth arithmetic circuit and data stored in a circuit other than the fourth arithmetic circuit, and a polling circuit configured to read the transmission data via the second cache memory when the second arithmetic package receives the information indicating the start of the transmission.

According to an aspect of the invention, an information processing device includes a first package including a first arithmetic circuit, first cache memory and a transmitting circuit, as well as a second package including a second arithmetic circuit, second cache memory and a receiving circuit. The first arithmetic circuit is configured to provide transfer data to the first cache memory that is destined for the second cache memory. The transmitting circuit is configured to transmit to the receiving circuit an indication of a data transfer of the transfer data and to restrict use of the first cache memory for data other than the transfer data during the data transfer. The receiving circuit is configured to receive the indication of the data transfer, to acquire the transfer data stored in the first cache memory and to store the acquired transfer data in the second cache memory.

According to an aspect of the invention, an information processing method includes storing, within a first cache memory, data input to and output from a first FPGA arithmetic circuit in accordance with a procedure of maintaining consistency between the data stored within the first cache memory and data stored in circuits other than the first cache memory; transmitting, to a second FPGA arithmetic circuit, information indicating start of transmission of transmission data from the first FPGA arithmetic circuit to the second FPGA arithmetic circuit; writing the transmission data to the first cache memory; restricting use of the first cache memory by data other than the transmission data; storing, within a second cache memory, data input to and output from the second FPGA arithmetic circuit in accordance with a procedure of maintaining consistency between the data stored within and second cache memory and data stored in circuits other than the second cache memory; and reading, with the second FPGA arithmetic circuit, the transmission data via the second cache memory when the second FPGA arithmetic circuit receives the information indicating the start of the transmission.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Information processing devices according to embodiments and information processing methods executed by the information processing devices will be described below with reference to the drawings. Configurations of the embodiments described below are illustrative, and the information processing devices and the information processing methods discussed herein are not limited by the configurations and functions of the embodiments described below.

Comparative Example

Figure 1:
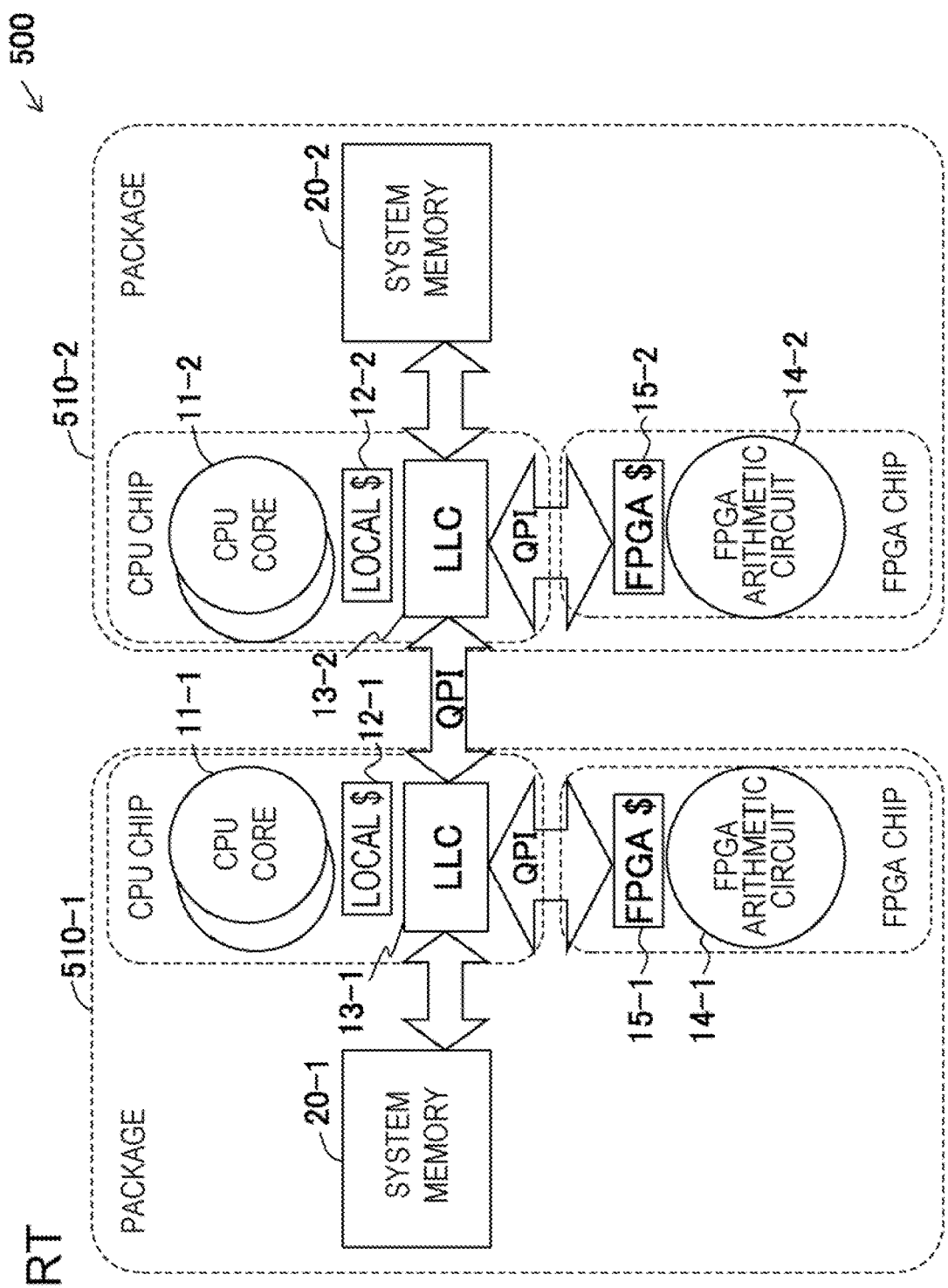
FIG. 1 is a diagram illustrating an information processing device according to a comparative example.

FIG. 1 illustrates an information processing device 500 according to a comparative example. The information processing device 500 includes two packages 510-1 and 510-2. The package 510-1 includes a CPU chip, an FPGA chip, and a system memory 20-1. The CPU chip of the package 510-1 includes a CPU core 11-1, a local cache 12-1, and a last level cache (LLC) 13-1. The CPU core 11-1 will also be simply referred to as the CPU 11-1. Further, the package 510-2 similarly includes a CPU chip, an FPGA chip, and a system memory 20-2. The CPU chip of the package 510-2 includes a CPU core 11-2, a local cache 12-2, and an LLC 13-2.

Further, the FPGA chip of the package 510-1 includes an FPGA arithmetic circuit 14-1 and an FPGA cache 15-1. In FIG. 1, each cache is represented by the dollar sign ($). The FPGA chip of the package 510-2 similarly includes an FPGA arithmetic circuit 14-2 and an FPGA cache 15-2.

The CPUs 11-1 and 11-2, the local caches 12-1 and 12-2, the FPGA caches 15-1 and 15-2, and the FPGA arithmetic circuits 14-1 and 14-2 will be referred to as the CPUs 11, the local caches 12, the FPGA caches 15, and the FPGA arithmetic circuits 14, respectively, when collectively referred to. Further, the packages 510-1 and 510-2 and the system memories 20-1 and 20-2 will be referred to as the packages 510 and the system memories 20, respectively, when collectively referred to. The CPUs 11 are connected to the FPGA arithmetic circuits 14 by a transmission line exemplified by a system bus, an interconnect, or a crossbar. FIG. 1 illustrates Intel QuickPath Interconnect (QPI) as the transmission line. The transmission line, however, is not limited to QPI in the present comparative example and the later-described embodiments.

The CPUs 11 exchange data with the FPGA arithmetic circuits 14 via the system memories 20. When the data exchange involves a system memory 20, that is, when a CPU 11 accesses an address in an address space of a system memory 20, the CPU 11 accesses the system memory 20 via the corresponding local cache 12 and corresponding LLC 13. Further, when an FPGA arithmetic circuit 14 accesses an address in an address space of a system memory 20, the FPGA arithmetic circuit 14 accesses the system memory 20 via the corresponding FPGA cache 15. Further, the LLC 13 is connected to the system memory 20 via a memory bus of a predetermined standard in accordance with the standard of the memory bus, such as double-data-rate (DDR), for example. The standard of the memory bus, however, is not limited in the present comparative example and the later-described embodiments.

Further, the CPU 11 is capable of accessing a register of the FPGA arithmetic circuit 14 via the transmission line. The transmission line through which the CPU 11 accesses the register of the FPGA arithmetic circuit 14 is disposed in an address space different from the address space of the system memory 20, for example. Such a method of accessing a register is called the direct method. Alternatively, the above-described transmission line may be disposed in a part of the address space of the system memory 20. The method in which the CPU 11 accesses the register of the FPGA arithmetic circuit 14 via the part of the address space of the system memory 20 is called the memory mapped method. In the memory mapped method, the CPU 11 may access the register of the FPGA arithmetic circuit 14 independently of a procedure in which cache controllers maintain the coherency between caches. That is, the CPU 11 may directly access the register of the FPGA arithmetic circuit 14 in accordance with the memory mapped method using an address set in the part of the address space of the system memory 20. In either case, the CPU 11 is capable of accessing the register of the FPGA arithmetic circuit 14 without via the system memory 20 or the local cache 12, for example. In the memory mapped method, however, the CPU 11 may access the register of the FPGA arithmetic circuit 14 in accordance with the procedure in which the cache controllers maintain the coherency between the caches.

Further, a memory controller (omitted in FIG. 1) in the system memory 20, a cache controller controlling the local cache 12, a cache controller controlling the LLC 13, and a cache controller controlling the FPGA cache 15 exchange data with each other in accordance with the procedure of maintaining the coherency between the caches. The coherency between the caches is also referred to as the cache coherency or cache consistency.

Methods such as the snooping method and the directory method are known as examples of the procedure of maintaining the coherency between the caches. Further, protocols such as the Modified, Exclusive, Shared, Invalid (MESI) protocol, the MSI protocol with Exclusive (E) removed therefrom, and the MOSI protocol with Owned (O) added thereto to replace Exclusive (E) are known as examples of the procedure of maintaining the coherency between the caches in accordance with the snooping method.

In the present comparative example and the later-described embodiments, however, the procedure of maintaining the coherency between the caches is not limited. In the present comparative example and the later-described embodiments, therefore, details of the procedure of maintaining the coherency between the caches will be omitted. It is assumed here that the memory controller in the system memory 20, the cache controller in the local cache 12, the cache controller in the LLC 13, and the cache controller in the FPGA cache 15 maintain the coherency between the caches with each other.

A single operating system is run in the plurality of CPUs 11 to control the hardware of the information processing device 500 and provide an execution environment to an application program (hereinafter simply referred to as the application) in the form of a process or thread. One of the plurality of CPUs 11 is assigned to the process or thread to execute the process or thread. Each of the plurality of CPUs 11 is capable of accessing the registers of the plurality of FPGA arithmetic circuits 14 via the transmission line. Each of the plurality of CPUs 11 is also capable of exchanging data with the plurality of FPGA arithmetic circuits 14 via the system memories 20. In the present comparative example and the later-described embodiments, the number of the CPUs 11, the number of the FPGA arithmetic circuits 14, and the number of the packages 510 are not limited to two. Further, in FIG. 1, the CPUs 11 and the FPGA arithmetic circuits 14 are connected on a one-to-one basis via the transmission line such as QPI. In the present comparative example and the later-described embodiments, however, the connection relationship between the CPUs 11 and the FPGA arithmetic circuits 14 is not limited to the one-to-one relationship. For example, a CPU 11 mounted on a single socket may be connected to a plurality of FPGA arithmetic circuits 14 via components such as a local cache 12 and a plurality of different FPGA caches 15.

Figure 2:
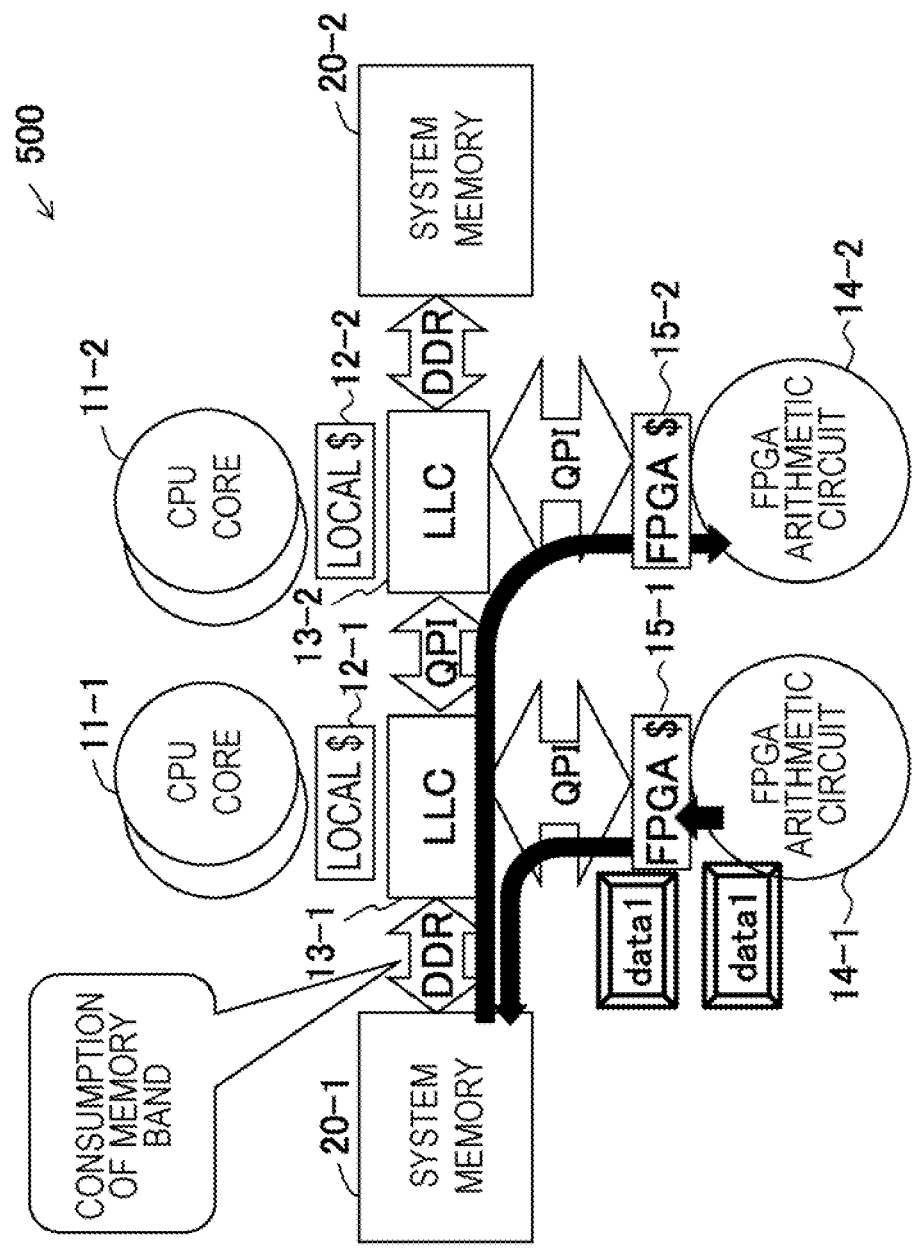
FIG. 2 is a diagram illustrating an issue of the information processing device according to the comparative example.

FIG. 2 illustrates an issue of the information processing device 500 of the comparative example. The plurality of FPGA arithmetic circuits 14 may exchange data depending on the application executed by the CPU 11. In the information processing device 500 of the comparative example, the exchange of data between the FPGA arithmetic circuits 14 is executed via the FPGA caches 15 and the system memories 20. However, the FPGA caches 15 are limited in capacity. If each of the FPGA arithmetic circuits 14 writes data to the corresponding FPGA cache 15 successively and continuously, therefore, the FPGA cache 15 eventually runs out of empty areas for entries of the data, causing replacement of data. In the replacement of data in the FPGA cache 15, existing data is purged to the corresponding system memory 20 in accordance with a known algorithm. If the replacement of data occurs, the data output from the FPGA arithmetic circuit 14 consumes the band of the memory bus, degrading the system performance of the information processing device 500 in some cases. In the information processing device 500 of the comparative example, therefore, it is desirable to perform high-speed data transfer between the plurality of FPGA arithmetic circuits 14 while suppressing the consumption of the band of the memory bus. For example, it is desirable to provide a mechanism of transferring data between the plurality of FPGA arithmetic circuits 14 without via the memory bus.

First Embodiment

Figure 3:
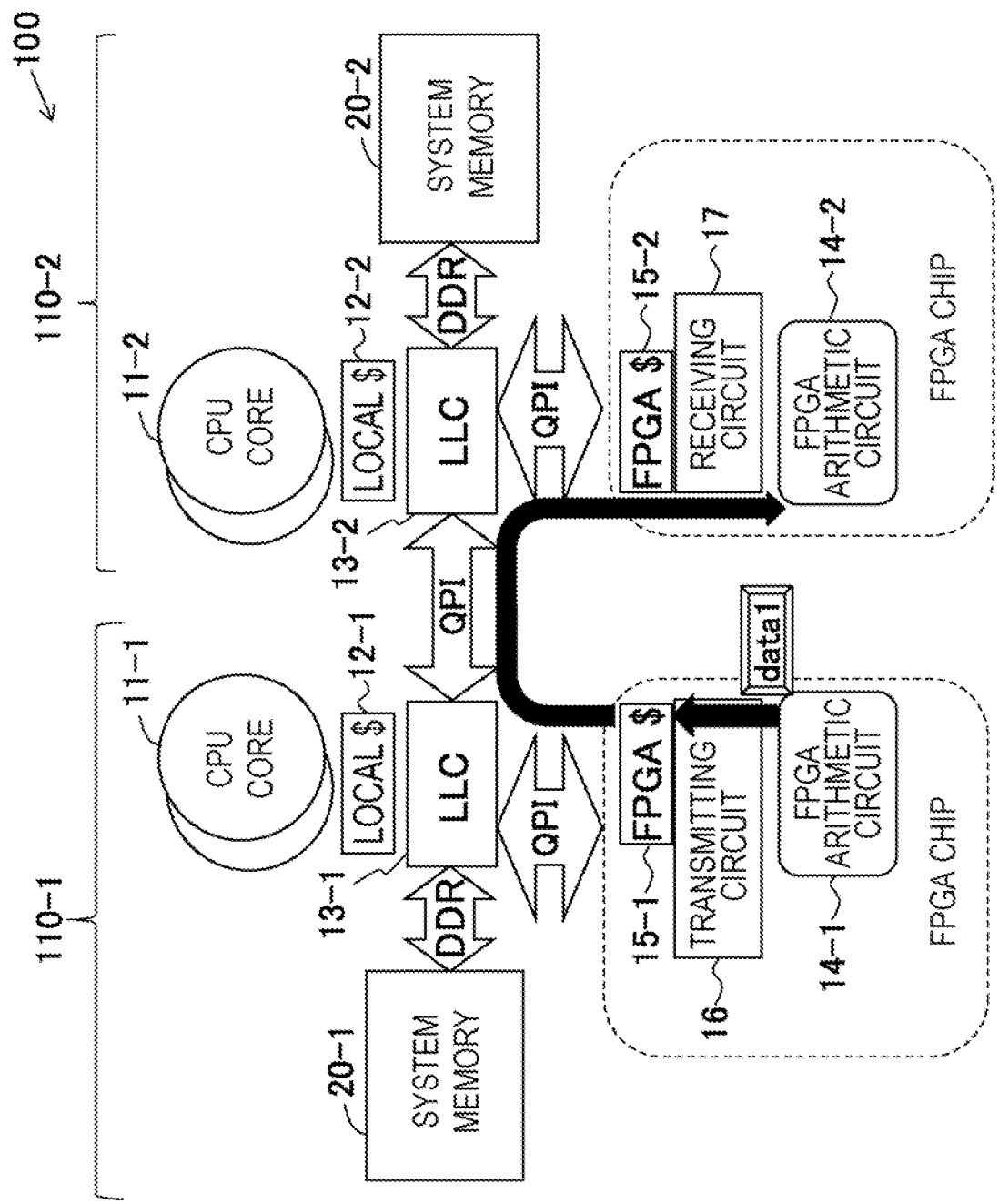
FIG. 3 is a diagram illustrating a configuration of an information processing device of a first embodiment and data flow in the information processing device.

An information processing device 100 according to a first embodiment will be described below with reference to FIGS. 3 to 15. FIG. 3 is a diagram illustrating a configuration of the information processing device 100 and data flow therein. The information processing device 100 in FIG. 3 includes the plurality of CPUs 11, the plurality of FPGA arithmetic circuits 14, and the plurality of system memories 20 similarly to the information processing device 500 of the comparative example. Further, the plurality of CPUs 11 and the plurality of FPGA arithmetic circuits 14 are connected by the transmission line such as QPI similarly as in the information processing device 500 of the comparative example. Further, each of the plurality of CPUs 11 accesses the corresponding system memory 20 via the corresponding local cache 12, the corresponding LLC 13, and the memory bus conforming to a standard such as DDR. Further, each of the plurality of FPGA arithmetic circuits 14 accesses the corresponding system memory 20 via the corresponding FPGA cache 15, the corresponding LLC 13, and the memory bus. The above-described configuration is similar to the configuration of the information processing device 500 of the comparative example, and thus description thereof will be omitted.

The information processing device 100 of the first embodiment further includes a transmitting circuit 16 and a receiving circuit 17. Each of the transmitting circuit 16 and the receiving circuit 17 is an application A specific circuit provided in the corresponding FPGA chip for an individual application (application A, for example) executed by the corresponding CPU 11. In the transmitting circuit 16 and the receiving circuit 17, information such as parameters for data transfer is rewritten for each of applications executed by the CPU 11, to thereby efficiently transfer data between the FPGA arithmetic circuits 14. The parameters for data transfer include, for example, the amount of data transferred from the transmitting circuit 16 to the receiving circuit 17 in one transfer process. The transmitting circuit 16 and the receiving circuit 17, however, may be shared by a plurality of applications.

In the first embodiment, a section including the CPU 11-1, the FPGA arithmetic circuit 14-1, the transmitting circuit 16, the FPGA cache 15-1, and the system memory 20-1 forms a package 110-1. Further, a section including the CPU 11-2, the FPGA arithmetic circuit 14-2, the receiving circuit 17, the FPGA cache 15-2, and the system memory 20-2 forms a package 110-2. Although omitted in FIG. 3, the package 110-1 also includes a circuit equivalent to the receiving circuit 17. Further, the package 110-2 also includes a circuit equivalent to the transmitting circuit 16. The CPU 11-1 is an example of a first arithmetic circuit, and the FPGA arithmetic circuit 14-1 is an example of a second arithmetic circuit. The CPU 11-2 is an example of a third arithmetic circuit, and the FPGA arithmetic circuit 14-2 is an example of a fourth arithmetic circuit. The CPU 11-1 and the FPGA arithmetic circuit 14-1 form an example of a first arithmetic unit, and the CPU 11-2 and the FPGA arithmetic circuit 14-2 form an example of a second arithmetic unit. The FPGA cache 15-1 is an example of a first cache memory, and the FPGA cache 15-2 is an example of a second cache memory. The transmission line such as QPI is an example of a transmission line that connects both the first arithmetic circuit of the first arithmetic unit and the third arithmetic circuit of the second arithmetic unit to both the second arithmetic circuit of the first arithmetic unit and the fourth arithmetic circuit of the second arithmetic unit.

As in FIG. 3, data output from the FPGA arithmetic circuit 14-1 (data 1), for example, is transferred to the FPGA arithmetic circuit 14-2 via the transmitting circuit 16, the FPGA caches 15-1 and 15-2, the transmission line such as QPI, the LLCs 13-1 and 13-2, and the receiving circuit 17.

When writing data to the transmission-side FPGA cache 15-1, the transmitting circuit 16 of the present embodiment controls access to the FPGA cache 15-1 so that purging of data from the FPGA cache 15-1 (replacement of data in a cache block) will not occur. That is, the transmitting circuit 16 limits the access to the FPGA cache 15-1 by another memory transaction. Therefore, the data written to the FPGA cache 15-1 from the FPGA arithmetic circuit 14-1 via the transmitting circuit 16 is transferable to the FPGA cache 15-2 without via the system memories 20. That is, the data written to the FPGA cache 15-1 is transferred to the FPGA cache 15-2 in accordance with the protocol of maintaining the coherency between the caches.

More specifically, in the first embodiment, the receiving circuit 17 detects the start of the transfer based on an instruction from the transmitting circuit 16 to start the transfer. The receiving circuit 17 then reads transfer data from the transfer-side FPGA cache 15-1 via the reception-side FPGA cache 15-2. The transmission-side FPGA cache 15-1 and the reception-side FPGA cache 15-2 exchange data in accordance with the protocol in which the coherency between the caches is maintained, similarly as described in the comparative example.

In this case, the protocol for maintaining the coherency is not limited. For example, the receiving circuit 17 accesses the reception-side FPGA cache 15-2 by specifying therein a read address in the corresponding system memory 20. Then, the FPGA cache 15-2 (actually, a cache controller thereof) recognizes, by bus snooping, the location at which the latest data corresponding to the read address is stored. In the example of FIG. 3, the latest data corresponding to the read address is in the transmission-side FPGA cache 15-1. Thus, the FPGA cache 15-2 acquires the latest data from the transmission-side FPGA cache 15-1. Then, the receiving circuit 17 acquires from the FPGA cache 15-2 the latest data corresponding to the read address, and delivers the latest data to the FPGA arithmetic circuit 14-2. The protocol for maintaining the coherency of the FPGA cache 15-1 is an example of a procedure of maintaining the consistency between the data input to and output from the second arithmetic circuit and data stored in a circuit other than the second arithmetic circuit. The protocol for maintaining the coherency of the FPGA cache 15-2 is an example of a procedure of maintaining consistency between the data input to and output from the fourth arithmetic circuit and data stored in a circuit other than the fourth arithmetic circuit.

Figure 4:
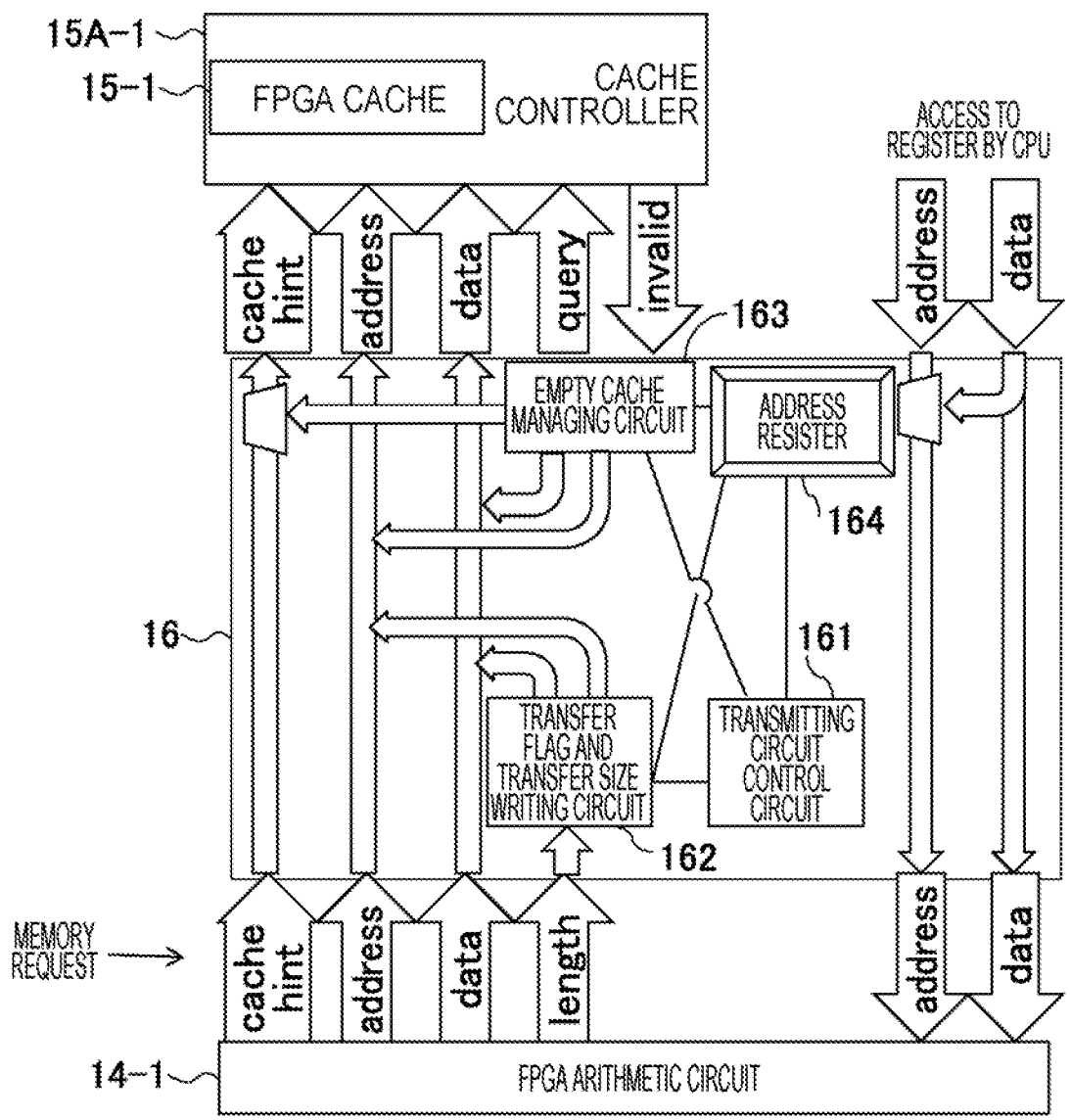
FIG. 4 is a diagram illustrating a detailed configuration of a transmitting circuit.

FIG. 4 is a diagram illustrating a detailed configuration of the transmitting circuit 16. FIG. 4 also illustrates the transmission-side FPGA arithmetic circuit 14-1, the transmission-side FPGA cache 15-1, and a transmission-side cache controller 15A-1. As in FIG. 4, the transmitting circuit 16 is interposed between the transmission-side FPGA arithmetic circuit 14-1 and the transmission-side cache controller 15A-1. Further, the transmitting circuit 16 transfers the data output from the FPGA arithmetic circuit 14-1 to the reception-side FPGA cache 15-2 via the transmission-side cache controller 15A-1 and the transmission-side FPGA cache 15-1. The transmitting circuit 16 includes a transmitting circuit control circuit 161, a transfer flag and transfer size writing circuit 162, an empty cache managing circuit 163, and an address register 164.

Each of the CPUs 11 is capable of writing data to the address register 164 of the transmitting circuit 16 and the register of the FPGA arithmetic circuit 14-1 via the transmission line such as QPI, without via the FPGA cache 15-1. The CPU 11 is therefore capable of controlling the transmitting circuit 16 and the FPGA arithmetic circuit 14-1 in accordance with the application executed by the CPU 11.

The transmitting circuit control circuit 161 is a digital circuit operating as a state machine and including a register that holds a state and a logic circuit that shifts the state or generates a control signal in accordance with an input signal. The transmitting circuit control circuit 161, however, may be a processor that executes processing in accordance with firmware stored in a memory such as a read only memory (ROM). The transmitting circuit control circuit 161 controls components of the transmitting circuit 16 in accordance with the operation of the state machine, for example.

The transfer flag and transfer size writing circuit 162 receives a transfer size (data transfer amount) of the data transferred from the FPGA arithmetic circuit 14-1, and notifies the receiving circuit 17 of the transfer size via a predetermined address in the corresponding system memory 20. Writing to the system memory 20 is executed via the FPGA cache 15-1. In the first embodiment, the transfer data having the data transfer amount specified as the transfer size is transferred to the FPGA arithmetic circuit 14-2 as divided into units corresponding to empty areas in the FPGA cache 15-1. The transfer flag and transfer size writing circuit 162 further transmits a transfer flag set to the ON state to the receiving circuit 17 via the predetermined address in the system memory 20. Herein, the transfer flag set to the ON state notifies the start of the transfer from the transmitting circuit 16 to the receiving circuit 17. The process of the transfer flag and transfer size writing circuit 162 is therefore understood as an example of writing the information indicating the start of the transmission to the memory via the first cache memory. Further, the transfer flag and transfer size writing circuit 162 is an example of a transmitting unit that transmits, to the second arithmetic unit, the information indicating the start of the transmission of transmission data from the second arithmetic circuit to the fourth arithmetic circuit.

The empty cache managing circuit 163 secures an empty capacity of the FPGA cache 15-1. More specifically, the empty cache managing circuit 163 transmits a query to the FPGA cache 15-1 to detect the presence of the empty areas. If the presence of the empty areas is detected, the empty cache managing circuit 163 then executes a data transfer process using the empty areas in the FPGA cache 15-1. That is, the empty cache managing circuit 163 determines whether the data delivered from the FPGA arithmetic circuit 14-1 is the transfer data. The empty cache managing circuit 163 then writes the transfer data to the empty areas in the FPGA cache 15-1. Meanwhile, the empty cache managing circuit 163 controls memory transactions to the FPGA cache 15-1 so that data other than the transfer data will not be written to the FPGA cache 15-1. The empty cache managing circuit 163 is an example of a writing unit that writes the transmission data to the first cache memory. The empty cache managing circuit 163 is also an example of a detecting unit that detects an empty area for holding the transmission data in the first cache memory.

That is, based on the address delivered from the FPGA arithmetic circuit 14-1, the empty cache managing circuit 163 determines whether the data delivered from the FPGA arithmetic circuit 14-1 is the transfer data to be transferred to the receiving circuit 17. Herein, the address refers to an address defined in the system memory 20. If the address of the data delivered from the FPGA arithmetic circuit 14-1 corresponds to the address of a transfer area secured in the system memory 20, the empty cache managing circuit 163 determines that the data delivered from the FPGA arithmetic circuit 14-1 is the transfer data. The empty cache managing circuit 163 then writes the transfer data to the empty areas secured in the FPGA cache 15-1 to hold the transfer data therein. The empty cache managing circuit 163 further performs control so that data other than the transfer data to be transferred to the receiving circuit 17 will not be written to the FPGA cache 15-1. With this control, the empty cache managing circuit 163 keeps the transfer data held in the FPGA cache 15-1 from being purged therefrom. The empty cache managing circuit 163 is an example of a restricting unit that restricts the use of the first cache memory by the data other than the transmission data.

The address register 164 holds the address of the transfer area secured in the system memory 20. The address of the transfer area is written to the address register 164 by the CPU 11, for example, to be held therein. The address of the transfer area is delivered to the empty cache managing circuit 163 from the address register 164. Based on the address held in the address register 164, the empty cache managing circuit 163 determines whether the data delivered from the FPGA arithmetic circuit 14-1 is the transfer data to be transferred to the receiving circuit 17. That is, the empty cache managing circuit 163 determines whether the address delivered from the FPGA arithmetic circuit 14-1 together with the data matches the address held in the address register 164 or is included in a predetermined address range. Then, if the delivered address matches the address held in the address register 164 or is included in the predetermined address range, the empty cache managing circuit 163 determines that the data is the transfer data.

A description will be given below of an example of the procedure of the process performed by the transmitting circuit control circuit 161 in FIG. 4. When the address of the transfer area secured in the system memory 20 is written to the address register 164 by the CPU 11-1, for example, the transmitting circuit control circuit 161 causes the empty cache managing circuit 163 to secure the empty areas in the FPGA cache 15-1. The transmitting circuit control circuit 161 then causes the transfer flag and transfer size writing circuit 162 to write the transfer size and the transfer flag at the predetermined address in the system memory 20. Herein, the transfer size corresponds to the data transfer amount (length) provided by the FPGA arithmetic circuit 14-1. The transmitting circuit control circuit 161 then writes the data delivered from the FPGA arithmetic circuit 14-1 to the empty areas secured in the FPGA cache 15-1 based on the delivered address. In FIG. 4, the transmitting circuit control circuit 161 writes the data to the FPGA cache 15-1 via the empty cache managing circuit 163.

Herein, the empty cache managing circuit 163 determines whether the data delivered from the FPGA arithmetic circuit 14-1 is the transfer data to be transferred to the receiving circuit 17. Whether the data is the transfer data is determined based on whether the address delivered from the FPGA arithmetic circuit 14-1 together with the data corresponds to the address of the transfer area secured in the system memory 20. Then, if the data delivered from the FPGA arithmetic circuit 14-1 is the transfer data to be transferred to the receiving circuit 17, the empty cache managing circuit 163 writes the data from the FPGA arithmetic circuit 14-1 to the empty areas in the FPGA cache 15-1. In the writing of the transfer data, the empty cache managing circuit 163 writes the transfer data with a cache hint set to Modified (M).

That is, the empty cache managing circuit 163 newly sets a value in the FPGA cache 15-1. The cache hint is information specifying the state of data written to a cache memory. For example, a cache hint specifying data as Modified (M) indicates that the written data only exists in the cache in which the data is written, and that the values of the written data have been modified from the values thereof in a main memory. The data specified as Modified (M) in the FPGA cache 15-1 is written back to the system memory 20 before an FPGA arithmetic circuit 14 other than the FPGA arithmetic circuit 14-1 or the CPU 11-1 allows data reading from the system memory 20 corresponding to a cache block of this data. Further, if the information processing device 100 executes implicit write back, the data specified as Modified (M) in the FPGA cache 15-1 is set to the Invalid (I) after being transferred to the FPGA arithmetic circuit 14 other than the FPGA arithmetic circuit 14-1 or the CPU 11-1. Further, in this case, the data in the FPGA cache 15-1 is written back to the system memory 20.

Meanwhile, if the data from the FPGA arithmetic circuit 14-1 is not the transfer data to be transferred to the receiving circuit 17, the empty cache managing circuit 163 sets the cache hint to Invalid (I). The data with the cache hint set to Invalid (I) is written back to the system memory 20 by the cache controller 15A-1, without being stored in the FPGA cache 15-1. That is, the empty cache managing circuit 163 performs control so that the data other than the transfer data will not be written to the FPGA cache 15-1, and thus that the transfer data held in the FPGA cache 15-1 will not be purged to the system memory 20.

The empty cache managing circuit 163 accesses the FPGA cache 15-1 via the cache controller 15A-1. That is, the empty cache managing circuit 163 transmits to the cache controller 15A-1 a memory request including the cache hint, the address in the system memory 20, and the data, and writes the data to the FPGA cache 15-1. The empty cache managing circuit 163 further transmits a query to the cache controller 15A-1 as a part of the memory request, and acquires a response (the number of empty areas) thereto.

If the FPGA cache 15-1 employs a fully associative system, for example, the empty cache managing circuit 163 acquires from the cache controller 15A-1 the number of empty areas in the entire FPGA cache 15-1. Further, if the FPGA cache 15-1 employs a set associative system, the empty cache managing circuit 163 acquires from the cache controller 15A-1 the number of empty areas in a set identified by the address. A unit area for data replacement, which serves as an empty area in the FPGA cache 15-1, is called the cache line or cache block.

Figure 5:
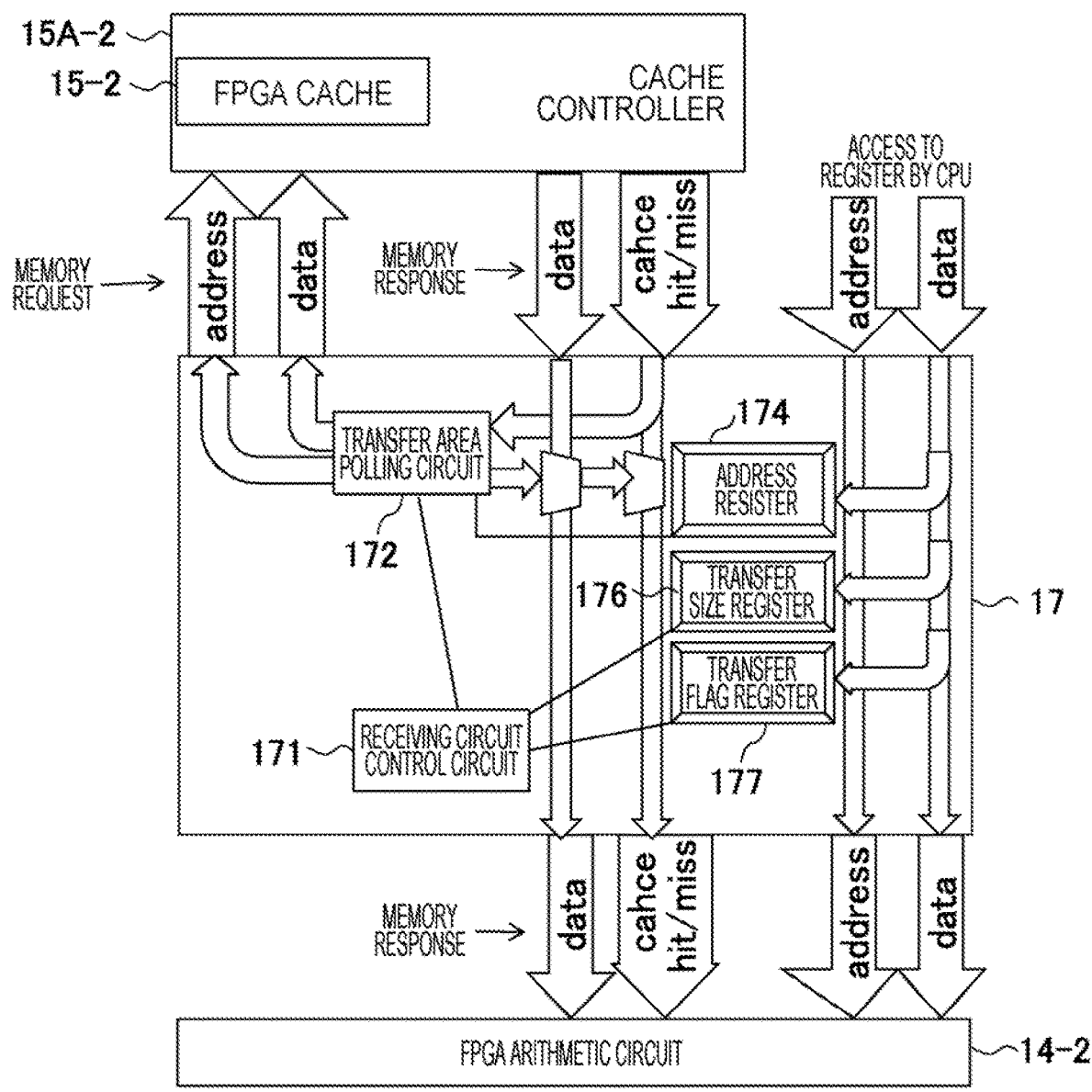
FIG. 5 is a diagram illustrating a detailed configuration of a receiving circuit.

FIG. 5 is a diagram illustrating a detailed configuration of the receiving circuit 17. FIG. 5 also illustrates the reception-side FPGA arithmetic circuit 14-2, the reception-side FPGA cache 15-2, and a reception-side cache controller 15A-2. As in FIG. 5, the receiving circuit 17 is interposed between the reception-side FPGA arithmetic circuit 14-2 and the reception-side cache controller 15A-2. Further, the receiving circuit 17 acquires the transfer data from the transmission-side FPGA cache 15-1 via the reception-side cache controller 15A-2 and the reception-side FPGA cache 15-2.

The receiving circuit 17 includes a receiving circuit control circuit 171, a transfer area polling circuit 172, an address register 174, a transfer size register 176, and a transfer flag register 177.

The CPU 11 is capable of writing data to the address register 174, the transfer size register 176, and the transfer flag register 177 of the receiving circuit 17 and the FPGA arithmetic circuit 14-2 via the transmission line such as QPI, without via the FPGA cache 15-2. The CPU 11 is therefore capable of controlling the receiving circuit 17 and the FPGA arithmetic circuit 14-2 in accordance with the application executed by the CPU 11.

The receiving circuit control circuit 171 is a digital circuit operating as a state machine and including a register that holds a state and a logic circuit that shifts the state or generates a control signal in accordance with an input signal. The receiving circuit control circuit 171, however, may be a processor that executes processing in accordance with firmware stored in a memory such as a ROM. The receiving circuit control circuit 171 controls components of the receiving circuit 17 in accordance with the operation of the state machine, for example.

The transfer area polling circuit 172 acquires the transfer data from the transmission-side FPGA cache 15-1 via the reception-side FPGA cache 15-2. Based on an address set in the address register 174, the transfer area polling circuit 172 accesses the reception-side FPGA cache 15-2, and acquires the transfer data therefrom. More specifically, the transfer area polling circuit 172 transmits a memory request specifying the address (address and data in FIG. 5) to the cache controller 15A-2. The transfer area polling circuit 172 then acquires a memory response to the memory request from the cache controller 15A-2. The memory response includes the data and the cache hint from the reception-side FPGA cache 15-2. If the cache hint represents cache miss, however, the cache hint indicates that data acquisition based on the memory request has failed. If the cache hint represents cache miss, therefore, the transfer area polling circuit 172 retries the data acquisition by transmitting again the memory request to the cache controller 15A-2. If the cache hint does not represent cache miss, the transfer area polling circuit 172 delivers the memory response (the data and the cache hint) from the cache controller 15A-2 to the FPGA arithmetic circuit 14-2. The transfer area polling circuit 172 is an example of a first reading unit that reads the transmission data via the second cache memory.

The address register 174 holds the head address of the transfer area secured in the system memory 20 by the CPU 11. The head address of the transfer area is written to the address register 174 by the CPU 11. The transfer size register 176 and the transfer flag register 177 hold the data transfer size and the transfer flag, respectively, which are written thereto by the CPU 11. In place of the CPU 11, however, the receiving circuit control circuit 171 may poll, via the cache controller 15A-2 and the FPGA cache 15-2, the address in the system memory 20 at which the data transfer size and the transfer flag are stored, for example.

A description will be given below of an example of the procedure of the process performed by the receiving circuit control circuit 171 in FIG. 5. For example, when the head address of the transfer area secured in the system memory 20 is written to the address register 164 by the CPU 11-1 and the transfer flag in the ON state is written to the transfer flag register 177, the receiving circuit control circuit 171 starts a transfer data receiving process. That is, the receiving circuit control circuit 171 instructs the transfer area polling circuit 172 to execute the processing thereof. The receiving circuit control circuit 171, however, may poll the system memory 20 for the transfer flag, as described above, when the head address of the transfer area is written to the address register 164 by the CPU 11-1.

The transfer area polling circuit 172 inputs a memory request to the reception-side cache controller 15A-2. If a memory cache miss occurs, the transfer area polling circuit 172 retries the memory request. Then, if the transfer area polling circuit 172 succeeds in normal data acquisition from the FPGA cache 15-2 via the cache controller 15A-2, the transfer area polling circuit 172 delivers the acquired data to the FPGA arithmetic circuit 14-2.

Figure 6:
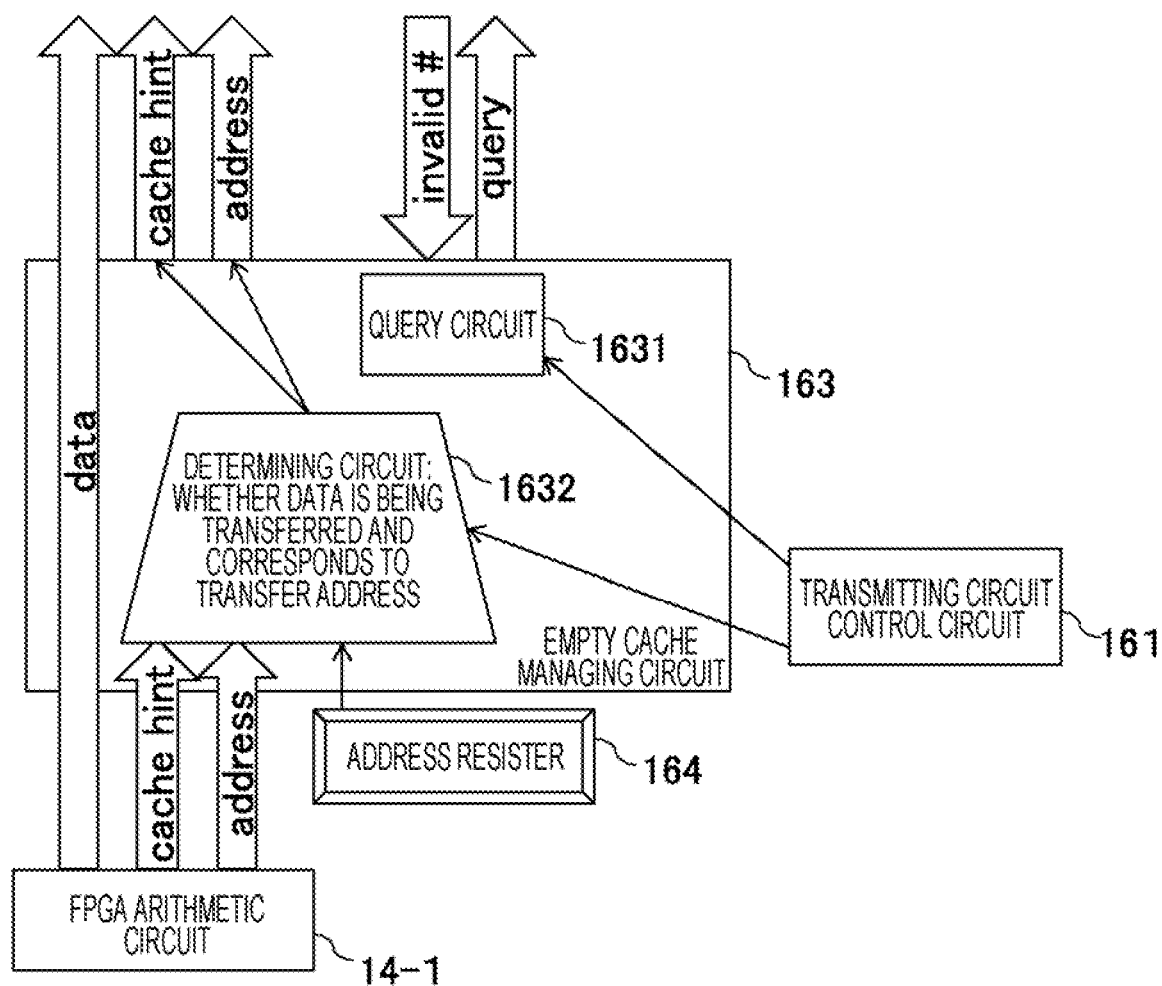
FIG. 6 is a diagram illustrating a detailed configuration of an empty cache managing circuit.

FIG. 6 is a diagram illustrating a detailed configuration of the empty cache managing circuit 163 in FIG. 4. FIG. 6 illustrates the transmitting circuit control circuit 161 and the address register 164 as well as the empty cache managing circuit 163. The empty cache managing circuit 163 includes a query circuit 1631 and a determining circuit 1632. The query circuit 1631 transmits a query to the cache controller 15A-1 in accordance with an instruction from the transmitting circuit control circuit 161, and acquires the number of empty areas (the number of cache blocks or cache lines in the Invalid (I) state) in the FPGA cache 15-1.

In accordance with an instruction from the transmitting circuit control circuit 161, the determining circuit 1632 determines whether the data to be written to the FPGA cache 15-1 is the transfer data. The determination of whether the data to be written to the FPGA cache 15-1 is the transfer data may be made during the time from the receipt by the transmitting circuit control circuit 161 of a transfer request from the FPGA arithmetic circuit 14-1 to the completion of data transfer in response to the transfer request (referred to as the transfer period). That is, the determining circuit 1632 may directly deliver the cache hint from the FPGA arithmetic circuit 14-1 to the cache controller 15A-1 outside the transfer period.

That is, the determining circuit 1632 compares the address in the address register 164 with the address delivered from the FPGA arithmetic circuit 14-1. Then, if the address delivered from the FPGA arithmetic circuit 14-1 matches the head address of the transfer area secured in the system memory 20 or is included in a predetermined address range, the determining circuit 1632 determines that the data delivered from the FPGA arithmetic circuit 14-1 is the transfer data to be transferred to the receiving circuit 17. The address matching the head address of the transfer area or included in the predetermined address range means an address in the transfer area secured in the system memory 20. Meanwhile, if the address delivered from the FPGA arithmetic circuit 14-1 is an address outside the transfer area secured in the system memory 20, the determining circuit 1632 determines that the data delivered from the FPGA arithmetic circuit 14-1 is not the transfer data to be transferred to the receiving circuit 17.

Then, if the determining circuit 1632 determines that the data is the transfer data during the transfer period, the determining circuit 1632 sets the cache hint to Modified (M) and delivers the cache hint to the cache controller 15A-1. Then, the cache controller 15A-1 writes the data output from the FPGA arithmetic circuit 14-1 to the FPGA cache 15-1. Meanwhile, if the determining circuit 1632 determines that the data is not the transfer data during the transfer period, the determining circuit 1632 sets the cache hint to Invalid (I) and delivers the cache hint to the cache controller 15A-1. Then, the cache controller 15A-1 directly writes the data output from the FPGA arithmetic circuit 14-1 to the system memory 20 without writing the data to the FPGA cache 15-1. With the above-described process, the empty cache managing circuit 163 writes the transfer data to the FPGA cache 15-1, and restricts the use of the FPGA cache 15-1 by data other than the transfer data. The process performed by the determining circuit 1632 is an example of determining, after the presence of the empty area is detected, whether data to be written to the first cache memory is the transmission data based on an address specified in a memory accessible by the first arithmetic unit and the second arithmetic unit, and restricting the use of the first cache memory by the data other than the transmission data.

Figure 7:
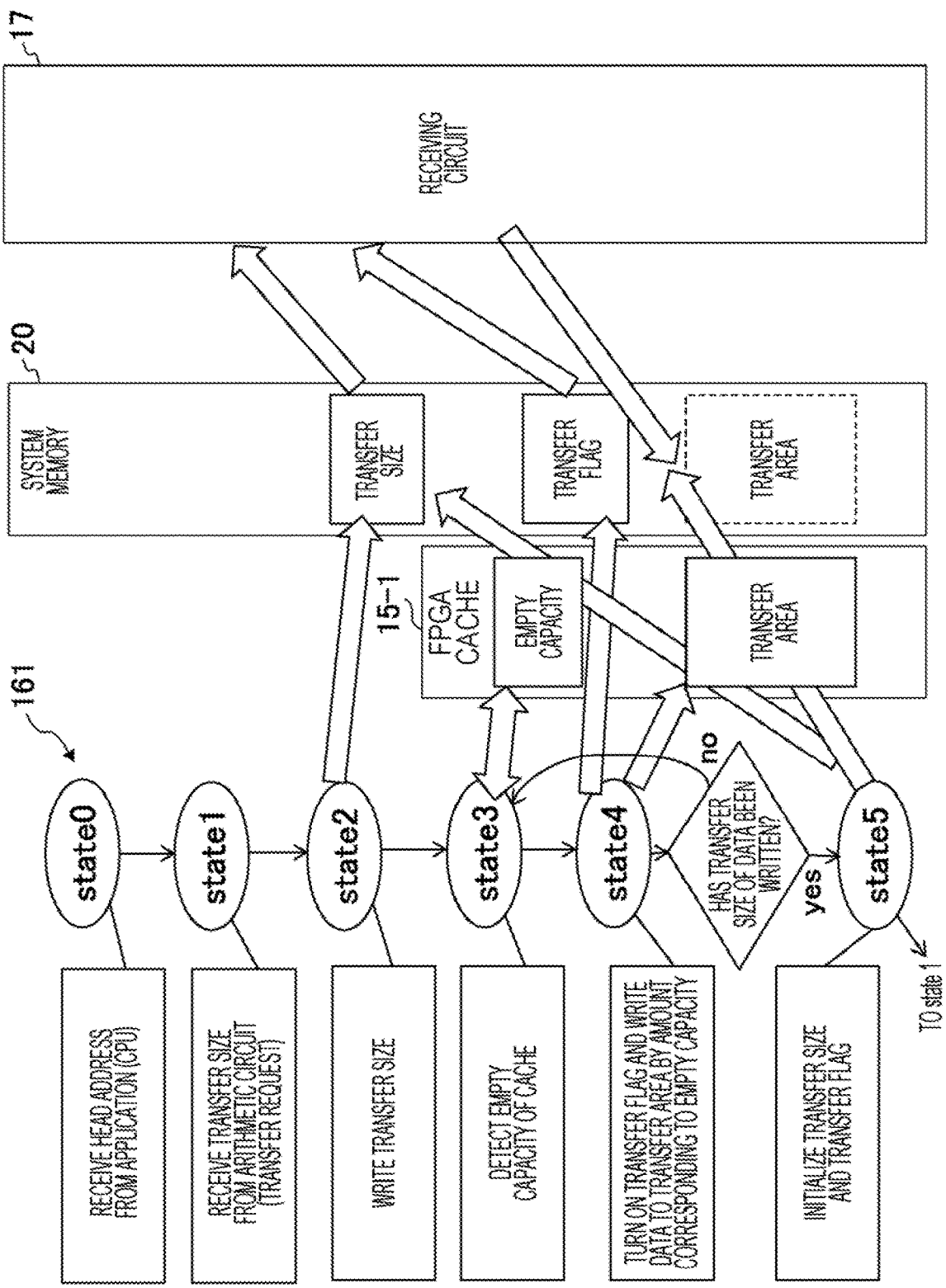
FIG. 7 is a sequence diagram illustrating a process of a transmitting circuit control circuit.

FIG. 7 is a sequence diagram illustrating a process of the transmitting circuit control circuit 161. FIG. 7 illustrates the system memory 20 and the receiving circuit 17 as well as the sequence diagram. In an initial state (state 0), the transmitting circuit control circuit 161 waits to receive the head address of the transfer area secured in the system memory 20 from the CPU 11 executing the application program. After receiving the head address of the transfer area, the transmitting circuit control circuit 161 proceeds to state 1. The CPU 11 delivers the head address of the transfer area to the register of the FPGA arithmetic circuit 14-1 as well as to the transmitting circuit control circuit 161. The FPGA arithmetic circuit 14-1 issues a memory request for the transfer data to be transmitted to the FPGA arithmetic circuit 14-2 by specifying the address of the transfer area in the memory request.

In state 1, the transmitting circuit control circuit 161 waits to receive the transfer request and the transfer size from the FPGA arithmetic circuit 14-1. After receiving the transfer size, the transmitting circuit control circuit 161 proceeds to state 2. The process performed by the transmitting circuit control circuit 161 in state 1 is an example of acquiring the data amount of the transmission data.

In state 2, the transmitting circuit control circuit 161 writes the transfer size at a predetermined address in the system memory 20. The transfer size is read from the system memory 20 and written to the transfer size register 176 of the receiving circuit 17 by the CPU 11 executing the application program, for example. The transfer size, however, may be acquired and written to the transfer size register 176 by the receiving circuit control circuit 171 of the receiving circuit 17 through polling the predetermined address in the system memory 20. After writing the transfer size at the predetermined address in the system memory 20, the transmitting circuit control circuit 161 proceeds to state 3.

In state 3, the transmitting circuit control circuit 161 detects the empty capacity of the FPGA cache 15-1 via the empty cache managing circuit 163. That is, in accordance with an instruction from the transmitting circuit control circuit 161, the empty cache managing circuit 163 transmits a query to the cache controller 15A-1, and acquires the empty capacity. After acquiring the empty capacity via the empty cache managing circuit 163, the transmitting circuit control circuit 161 proceeds to state 4. The process performed by the transmitting circuit control circuit 161 in state 3 is an example of repeatedly detecting the presence or absence of the empty area.

After acquiring the empty capacity in state 3, the transmitting circuit control circuit 161 turns on the transfer flag in state 4. The process of turning on the transfer flag may be executed only once when the empty capacity is first acquired in state 3, or may be repeatedly executed each time the empty capacity is acquired in state 3. The transmitting circuit control circuit 161 further acquires the transfer size of transfer data from the FPGA arithmetic circuit 14-1. The transmitting circuit control circuit 161 then writes, via the empty cache managing circuit 163, the transfer data to the FPGA cache 15-1 by an amount corresponding to the empty capacity of the FPGA cache 15-1. Herein, the empty cache managing circuit 163 sets the cache hint of the data written to the FPGA cache 15-1 to Modified (M). The data set to the Modified (M) state in the FPGA cache 15-1 is subjected to implicit write back by the cache controller 15A-1 when the data is read by the reception-side FPGA cache 15-2. That is, the data set to the Modified (M) is written to the transfer area in the system memory 20 in the above-described reading process, and the areas in the FPGA cache 15-1 corresponding to the transfer data are invalidated, becoming empty areas. The process performed by the transmitting circuit control circuit 161 in state 4 following state 3 is an example of a process of, when the presence of the empty area is detected, causing the writing unit to write the transmission data to the empty area by an amount corresponding to the capacity of the empty area. The writing to the system memory 20 is executed via the FPGA cache 15-1. Therefore, that the transmitting circuit control circuit 161 writes the transfer flag at the predetermined address in the system memory 20 in state 2 is understood as an example of writing the information indicating the start of the transmission to the memory via the first cache memory. The cache controller 15A-1 executing implicit write back is an example of a cache control unit that, when the transmission data written in the empty area is read by the first reading unit via the second cache memory, invalidates the empty area for the written transmission data.

The transmitting circuit control circuit 161 then determines whether the writing of the transfer size of transfer data to the FPGA cache 15-1 has been completed. If the writing of the transfer size of transfer data to the FPGA cache 15-1 has not been completed, the transmitting circuit control circuit 161 proceeds to state 3. In state 3, the transmitting circuit control circuit 161 waits for the transfer data to be read by the receiving circuit 17 via the receiving circuit-side FPGA cache 15-2. After the transfer data is read, the areas in the transmitting circuit-side FPGA cache 15-1 used to store the transfer data are invalidated through implicit write back by the cache controller 15A-1, and thus become empty areas. The transmitting circuit control circuit 161 thus switches between state 3 and state 4 until all of the remaining data is written to the empty areas in the FPGA cache 15-1.

As described above, the exchange of data between the FPGA caches 15-1 and 15-2 is executed without via the system memories 20 in accordance with the protocol of maintaining the coherency between the caches. That is, the cache controllers 15A-1 and 15A-2 exchange the transfer data via the transmission line such as QPI illustrated in FIG. 3. Further, when the transfer data set in the Modified (M) state in the FPGA cache 15-1 is delivered to the FPGA cache 15-2, the cache controller 15A-1 executes implicit write back, as described above. In implicit write back, the cache controller 15A-1 invalidates the areas (cache lines or cache blocks) for the transfer data in the FPGA cache 15-1, and stores the transfer data in the corresponding system memory 20.

Meanwhile, after the writing of the transfer size of transfer data to the FPGA cache 15-1 is completed in state 4, the transmitting circuit control circuit 161 proceeds to state 5. In state 5, the transmitting circuit control circuit 161 initializes the transfer size and the transfer flag at the predetermined address in the system memory 20, and returns to state 1. The above-described process of the transmitting circuit control circuit 161 with the transition of the state from state 1 to state 5 continues until the CPU 11 completes one application.

Figure 8:
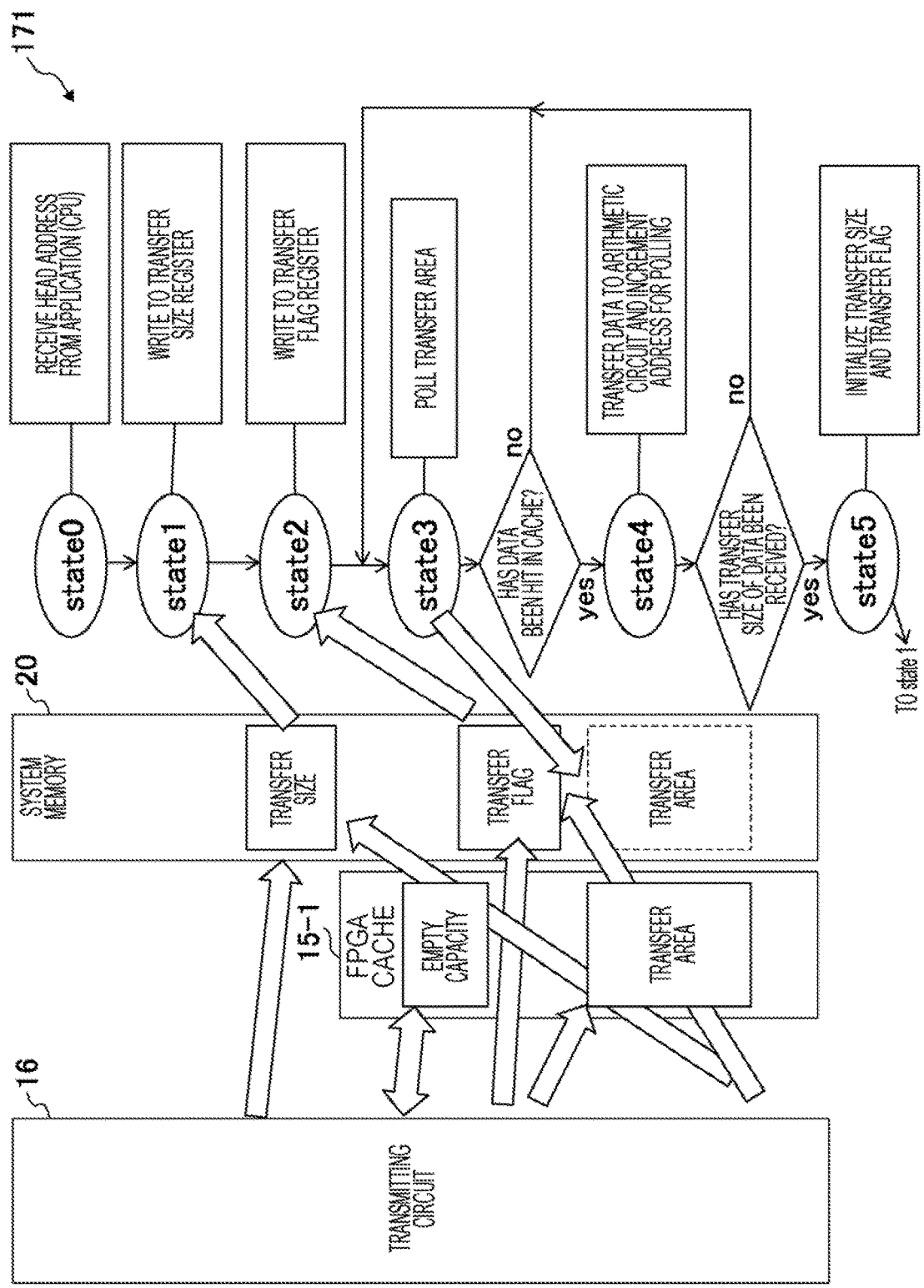
FIG. 8 is a sequence diagram illustrating a process of a receiving circuit control circuit.

FIG. 8 is a sequence diagram illustrating a process of the receiving circuit control circuit 171 corresponding to the process of FIG. 7. FIG. 8 illustrates the system memory 20 and the transmitting circuit 16 as well as the sequence diagram. In an initial state (state 0), the receiving circuit control circuit 171 waits to receive the head address of the transfer area secured in the system memory 20 by the CPU 11 executing the application program. After receiving the head address of the transfer area, the receiving circuit control circuit 171 proceeds to state 1.

In state 1, the receiving circuit control circuit 171 waits for the transfer size to be written to the transfer size register 176 by the CPU 11. In place of the CPU 11, however, the receiving circuit control circuit 171 may acquire the transfer size by polling the predetermined address in the system memory 20 via the cache controller 15A-2 and the FPGA cache 15-2, for example. Then, the receiving circuit control circuit 171 may write the acquired transfer size to the transfer size register 176. After the transfer size is written to the transfer size register 176, the receiving circuit control circuit 171 proceeds to state 2.

In state 2, the receiving circuit control circuit 171 waits for the transfer flag in the ON state to be written to the transfer flag register 177 by the CPU 11. In place of the CPU 11, however, the receiving circuit control circuit 171 may acquire the transfer flag in the ON state by polling the predetermined address in the system memory 20 similarly as in the acquisition of the transfer size. Then, the receiving circuit control circuit 171 may write the acquired transfer flag in the ON state to the transfer flag register 177. After the transfer flag in the ON state is written to the transfer flag register 177, the receiving circuit control circuit 171 proceeds to state 3. As an example of a second reading unit that reads the information indicating the start of the transmission from the memory via the second cache memory, the receiving circuit control circuit 171 polls the predetermined address in the system memory 20 in state 2 to acquire the transfer flag in the ON state. Further, that the CPU 11 acquires the transfer flag in the ON state by polling the predetermined address in the system memory 20 in state 2 is an example of reading the information indicating the start of the transmission from the memory and delivering the information indicating the start of the transmission to the fourth arithmetic circuit via the transmission line.

In state 3, the receiving circuit control circuit 171 causes the transfer area polling circuit 172 to poll the transfer area via the reception-side FPGA cache 15-2. The polling by the transfer area polling circuit 172 is repeated until the data of the transfer area is hit in the FPGA cache 15-2. When the data of the transfer area is hit in the FPGA cache 15-2, the receiving circuit control circuit 171 proceeds to state 4. The process performed by the receiving circuit control circuit 171 and the transfer area polling circuit 172 in state 3 is an example of executing again the reading of the transmission data from the second cache memory if a cache miss occurs in the reading of the transmission data from the second cache memory based on the address specified in the memory.

In state 4, the receiving circuit control circuit 171 transfers the transfer data hit in the FPGA cache 15-2 to the FPGA arithmetic circuit 14-2. In this process, the receiving circuit control circuit 171 adds up the data amounts of data items transferred to the FPGA arithmetic circuit 14-2. The receiving circuit control circuit 171 further increments the address for polling by the data amount of data transferred to the FPGA arithmetic circuit 14-2. The incremented address may be held in the address register 174. The receiving circuit control circuit 171 then determines whether the data amount of the data transferred to the FPGA arithmetic circuit 14-2 has reached the transfer size in the transfer size register 176. If the data amount of the data transferred to the FPGA arithmetic circuit 14-2 has not reached the transfer size in the transfer size register 176, the receiving circuit control circuit 171 returns to state 3. Meanwhile, if the data amount of the data transferred to the FPGA arithmetic circuit 14-2 has reached the transfer size in the transfer size register 176, the receiving circuit control circuit 171 proceeds to state 5. In state 5, the transmitting circuit control circuit 161 initializes the transfer size register 176 and the transfer flag register 177, and returns to state 1.

Figure 9:
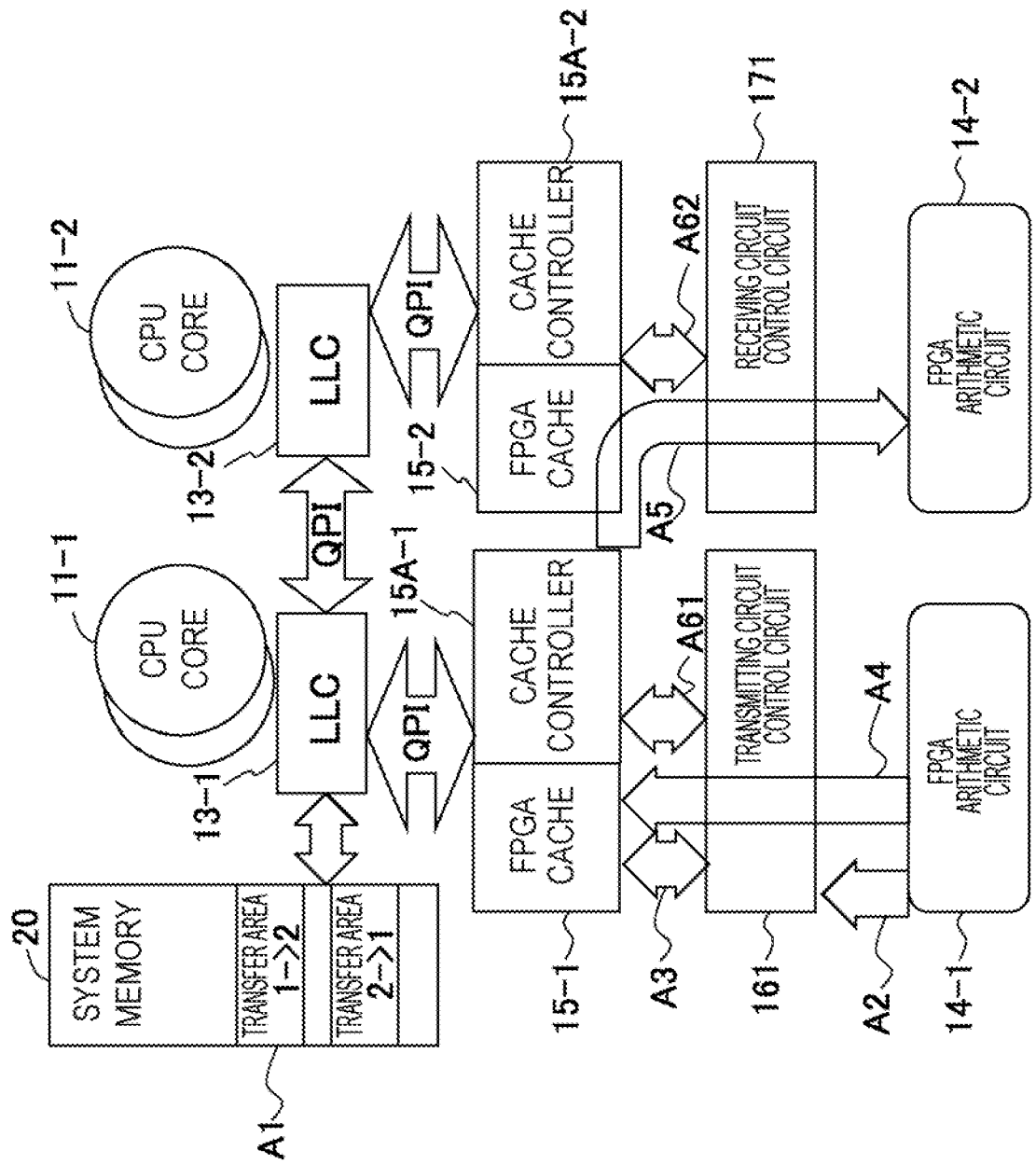
FIG. 9 is a diagram illustrating data flow in data transfer.

FIG. 9 is a diagram illustrating data flow in the data transfer from the transmission-side FPGA arithmetic circuit 14-1 to the reception-side FPGA arithmetic circuit 14-2. FIG. 9 is also understood as a diagram in which the process based on the sequence illustrated in FIGS. 7 and 8 is illustrated in terms of data flow.

In the present embodiment, each of the CPUs 11 of the information processing device 100 executes the processing thereof in cooperation with the FPGA arithmetic circuits 14-1 and 14-2 when executing an application program. As already described, the consumption of the memory bus band by the data transfer from the FPGA arithmetic circuit 14-1 to the FPGA arithmetic circuit 14-2 is suppressed in the information processing device 100 to efficiently execute the processing of the information processing device 100.

In the first data transfer process from the FPGA arithmetic circuit 14-1 to the FPGA arithmetic circuit 14-2, the CPU 11 secures in the system memory 20 the transfer area corresponding to the maximum data size of the data to be transferred (A1). The CPU 11 then writes the head address of the secured transfer area to the address register 164 of the transmitting circuit 16, a predetermined register of the FPGA arithmetic circuit 14-1, and the address register 174 of the receiving circuit 17 via the transmission line such as QPI illustrated in FIGS. 4 and 5.

Then, the transmission-side FPGA arithmetic circuit 14-1 notifies the transmitting circuit control circuit 161 of the data amount of the data desired to be transferred (referred to as the transfer size) (A2). Then, the transmitting circuit control circuit 161 instructs the empty cache managing circuit 163 to secure the empty capacity of the transmission-side FPGA cache 15-1 (A3). In this process, in accordance with the instruction from the transmitting circuit control circuit 161, the empty cache managing circuit 163 acquires from the cache controller 15A-1 the number of areas with the cache hint set to Invalid (I), which represents the empty capacity of the FPGA cache 15-1. Herein, the number of these areas is called the number of cache blocks or cache lines. The empty cache managing circuit 163 then performs control such that the cache hint is specified as Invalid (I) in the cache controller 15A-1 in other memory transactions until the transfer is completed. With this control, the empty cache managing circuit 163 restricts the purging of the transfer data from the FPGA cache 15-1 to the system memory 20.

Figure 10:
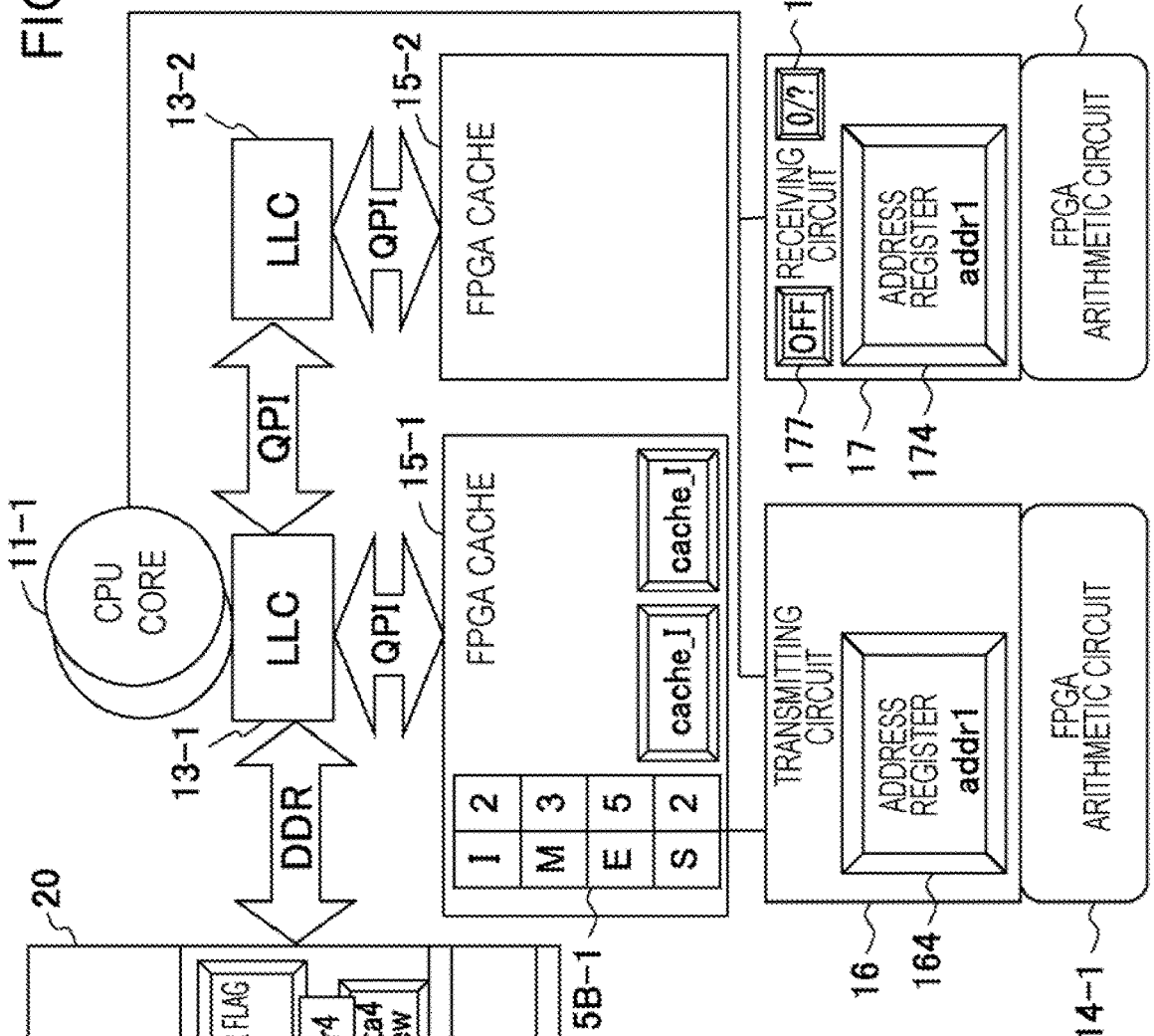
FIG. 10 is a diagram illustrating a state in which it is possible to secure a transfer area in a system memory.

FIG. 10 illustrates a state in which it is possible for the CPU 11-1 to secure the transfer area in the system memory 20. FIG. 10 also illustrates a counter that counts the number of the empty areas in the FPGA cache 15-1. In FIG. 10, however, components such as the CPU 11-2 and the cache controllers 15A-1 and 15A-2 are omitted.

In FIG. 10, a transfer area (1->2) and a transfer area (2->1) are secured in the system memory 20 by the CPU 11-1. The transfer area (1->2) is a transfer area for the transfer data to be transferred from the FPGA arithmetic circuit 14-1 to the FPGA arithmetic circuit 14-2. Further, the transfer area (2->1) is a transfer area for the transfer data to be transferred from the FPGA arithmetic circuit 14-2 to the FPGA arithmetic circuit 14-1. The head address of the transfer area (1->2) is addr1, and areas corresponding to addresses addr1 to addr4 are secured. The head address of the transfer area (1->2) is written to the address register 164 of the transmitting circuit 16 and the address register 174 of the receiving circuit 17 by the CPU 11-1. The transmission line through which the CPU 11-1 writes the head address to the address register 164 of the transmitting circuit 16 and the address register 174 of the receiving circuit 17 in FIG. 10 may be QPI through which information is exchanged in the memory mapped method in accordance with the control of maintaining the coherency between the caches. Further, the above-described transmission line may be QPI through which information is exchanged in the memory mapped method independently of the control of maintaining the coherency between the caches. Further, the above-described transmission line may be a path which is different from QPI and through which information is exchanged in the direct method using an address space independent of the address space of the system memory 20. As already described, the address of the transfer area is also written to the predetermined register of the FPGA arithmetic circuit 14-1.

At a predetermined address pertaining to the transfer area (1->2), an area for holding the transfer size and the transfer flag is secured. The initial value of the transfer size is 0, and the initial value of the transfer flag is OFF. Therefore, the transfer size register 176 of the receiving circuit 17 is set with the initial value 0, and the transfer flag register 177 of the receiving circuit 17 is set with the initial value OFF.

The FPGA cache 15-1 is provided with a counter 15B-1 managed by the cache controller 15A-1. The counter 15B-1 holds the number of areas in the FPGA cache 15-1 set to Invalid (I), the number of areas in the FPGA cache 15-1 set to Modified (M), the number of areas in the FPGA cache 15-1 set to Exclusive (E), and the number of areas in the FPGA cache 15-1 set to Shared (S). The transmitting circuit 16 is capable of acquiring the counter values from the cache controller 15A-1 by referring thereto. The transmitting circuit 16 recognizes the empty capacity (the number of empty cache blocks or empty cache lines) of the FPGA cache 15-1 from the number of areas set to Invalid (I).

Figure 11:
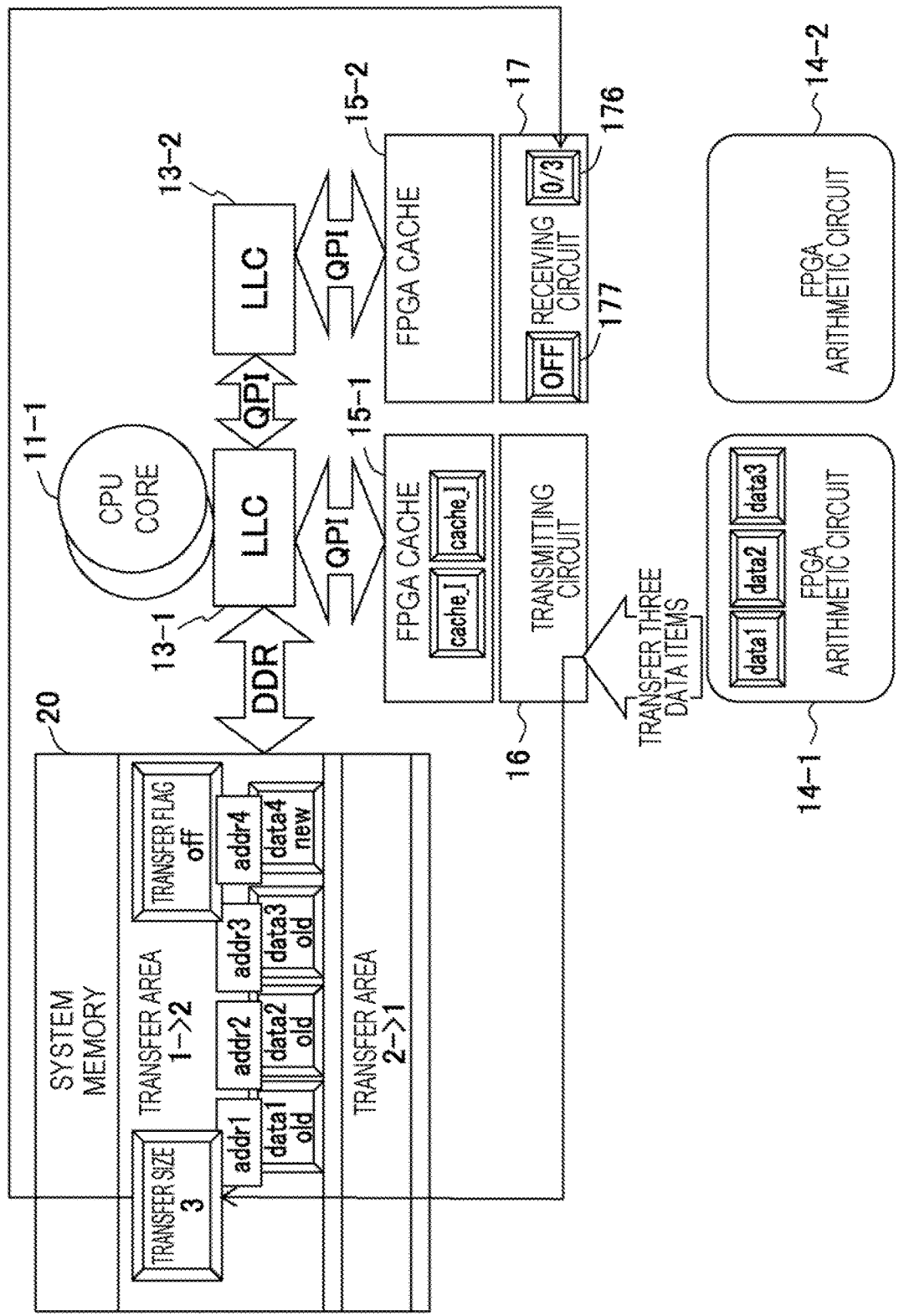
FIG. 11 illustrates an example of a process of notifying the transmitting circuit of a transfer size.
Figure 12:
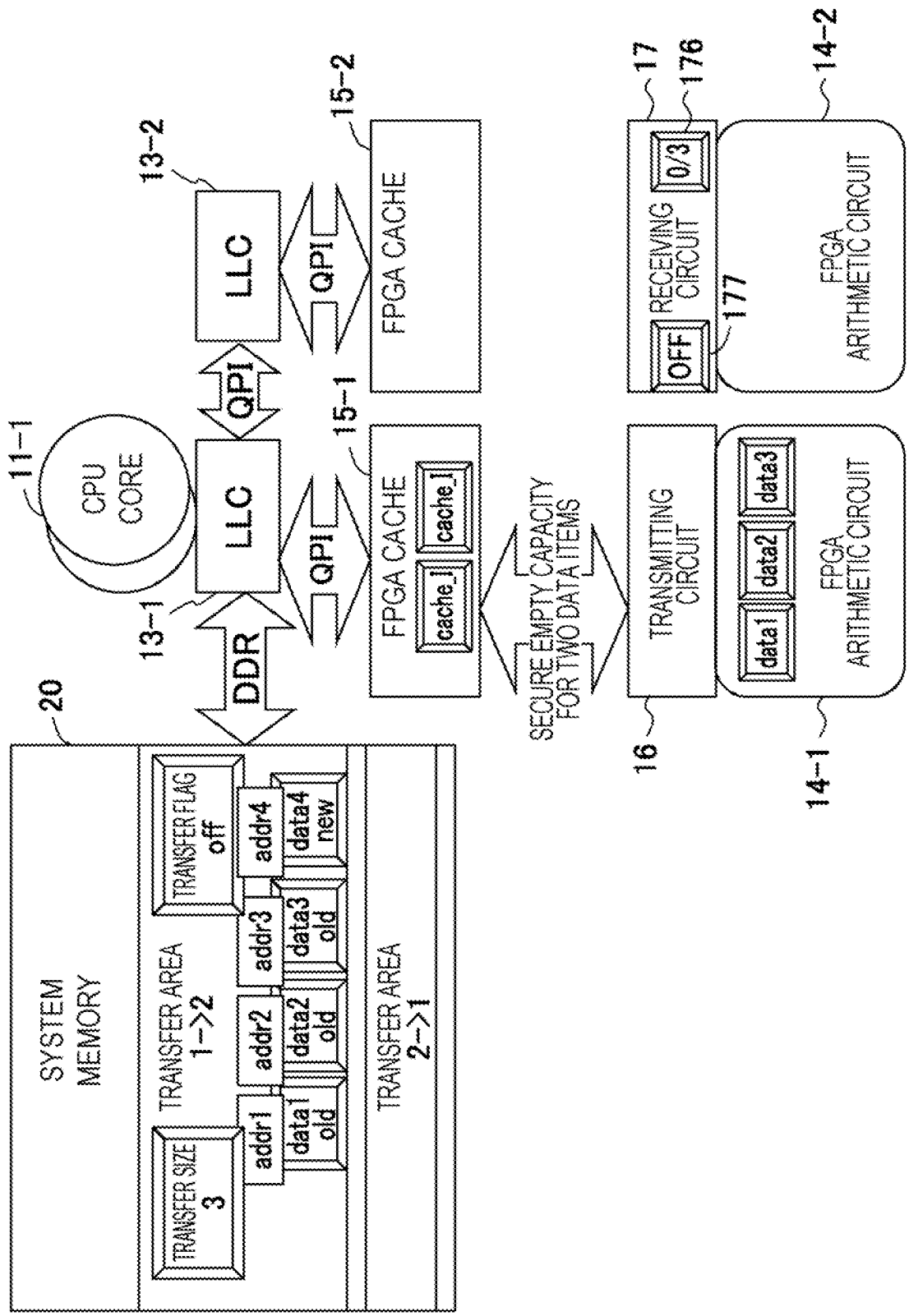
FIG. 12 is a diagram illustrating a state in which an empty capacity is secured.

FIG. 11 illustrates an example of a process in which the transmission-side FPGA arithmetic circuit 14-1 notifies the transmitting circuit 16 of the transfer size corresponding to the data amount of the data desired to be transferred. In this example, the transfer size (three data items, for example) is notified. The transmitting circuit 16 writes the transfer size at a predetermined address in the system memory 20. The written transfer size is written to the transfer size register 176 of the receiving circuit 17 by the CPU 11-1. The receiving circuit control circuit 171, however, may acquire the transfer size in the system memory 20 by polling, as already described. Further, in the state of FIG. 11, the transfer flag remains OFF, and the transfer data is not written in the empty areas secured in the FPGA cache 15-1. FIG. 12 illustrates a state in which an empty capacity corresponding to two data items is secured in the FPGA cache 15-1 in response to the notification of the transfer size by the FPGA arithmetic circuit 14-1.

Referring back to FIG. 9, the description of the data flow will be continued. The transmitting circuit control circuit 161 acquires the transfer data from the FPGA arithmetic circuit 14-1, and writes the transfer data to the FPGA cache 15-1 by the amount corresponding to the empty capacity (A4). The address in the system memory 20 corresponding to the write destination is counted up from the head of the transfer area. In the process of A4, however, the writing to the system memory 20 is not caused. The transmitting circuit control circuit 161 further transmits the transfer flag, which is set to the ON state to indicate the start of the transfer, to the receiving circuit control circuit 171 via the system memory 20 and the CPU 11. The transfer flag set to the ON state in the system memory 20, however, may be acquired by the receiving circuit control circuit 171 through polling, as already described. The transmitting circuit control circuit 161 thereafter repeats the processes of A3 and A4 until the completion of the transfer when the transfer data amount reaches the transfer size.

The receiving circuit control circuit 171 executes data reading from the head address of the transfer area via the transfer area polling circuit 172. If the transfer area polling circuit 172 receives a cache miss result from the FPGA cache 15-2 in the data reading, the transfer area polling circuit 172 determines that the data has not been written yet, discards the data, and executes the data reading again from the same address (A5).

When the area in the FPGA cache 15-1 corresponding to the address of the transfer area is invalidated after the transfer data is read therefrom, the transmitting circuit control circuit 161 recognizes the completion of the transfer and waits until the next transfer (A61). The receiving circuit control circuit 171 reads the transfer data written in A4, delivers the transfer data to the FPGA arithmetic circuit 14-2, and waits until the next transfer (A62).

Figure 13:
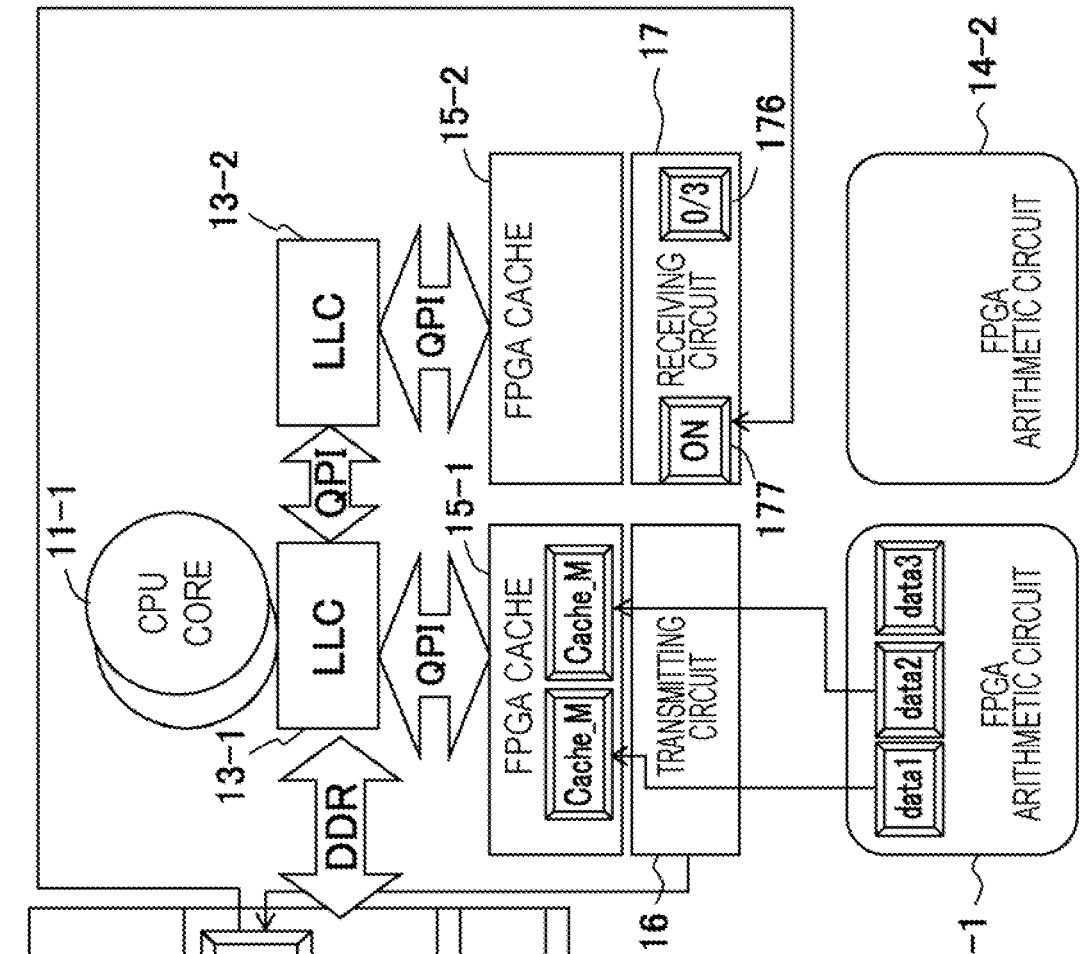
FIG. 13 is a diagram illustrating a state in which transfer data is written in empty areas.

FIG. 13 illustrates a state in which two transfer data items included in the transfer size of transfer data (three transfer data items) are written in the empty areas secured in the FPGA cache 15-1. The two transfer data items written in the FPGA cache 15-1 are both set to Modified (M). Thereafter, the transmitting circuit 16 causes the empty cache managing circuit 163 to control the output of the cache hint such that the cache hint is set to Invalid (I) in memory transactions. Until the reading by the receiving circuit 17 is completed, therefore, the two transfer data items written in the FPGA cache 15-1 are kept therein without being purged therefrom to the system memory 20. Further, in this process, the transmitting circuit 16 sets the transfer flag in the ON state in a predetermined area of the system memory 20. Then, the CPU 11-1 reads the transfer flag in the system memory 20, and turns on the transfer flag register 177 of the receiving circuit 17.

Figure 14:
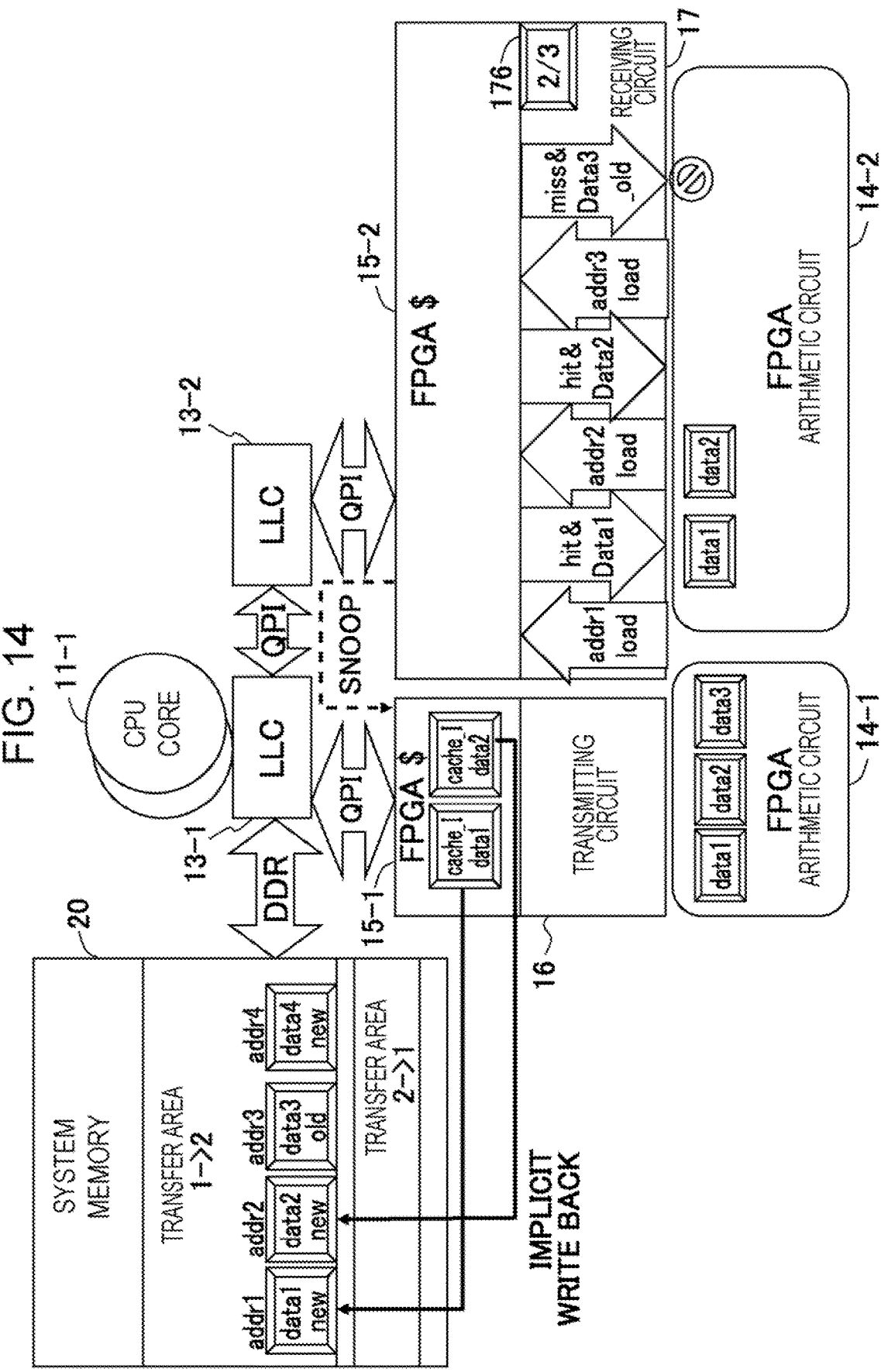
FIG. 14 is a diagram illustrating a polling process of the receiving circuit.

FIG. 14 illustrates a polling process of the receiving circuit 17. When the transfer flag register 177 of the receiving circuit 17 is set to the ON state, as in FIG. 13, the receiving circuit 17 starts reading the transfer data via the transfer area polling circuit 172 illustrated in FIG. 5. That is, based on the head address of the transfer area defined in the system memory 20, the receiving circuit 17 starts reading the transfer data from the FPGA cache 15-1 via the reception-side cache controller 15A-2.

The reception-side FPGA cache 15-2 (the cache controller 15A-2) snoops the transmission line exemplified by QPI to acquire the transfer data set in the Modified (M) state in the transmission-side FPGA cache 15-1, for example. That is, the receiving circuit 17 (the transfer area polling circuit 172) polls the head address (addr1) of the transfer area, and acquires the transfer data (data1) as a cache hit result. The receiving circuit 17 further counts up the address of the transfer area, polls the address (add2), and acquires data (data2) as a cache hit result. The FPGA cache 15-2 thus acquires data1 and data2 in the Modified (M) state from the FPGA cache 15-1. Then, the FPGA cache 15-1 (the cache controller 15A-1) writes the transfer data in the FPGA cache 15-1 back to the system memory 20 through implicit write back. As well as this write back, the FPGA cache 15-1 sets the transfer data in the FPGA cache 15-1 to Invalid (I) to create an empty capacity.

The receiving circuit 17 (the transfer area polling circuit 172) further counts up the address of the transfer area, polls the address (add3), and acquires a cache miss result. The receiving circuit 17 therefore recognizes that the third data item included in the transfer size of transfer data (the three transfer data items) has not been written to the FPGA cache 15-1 yet. Therefore, the receiving circuit 17 (the transfer area polling circuit 172) repeats polling the next address (addr3) of the transfer area.

Figure 15:
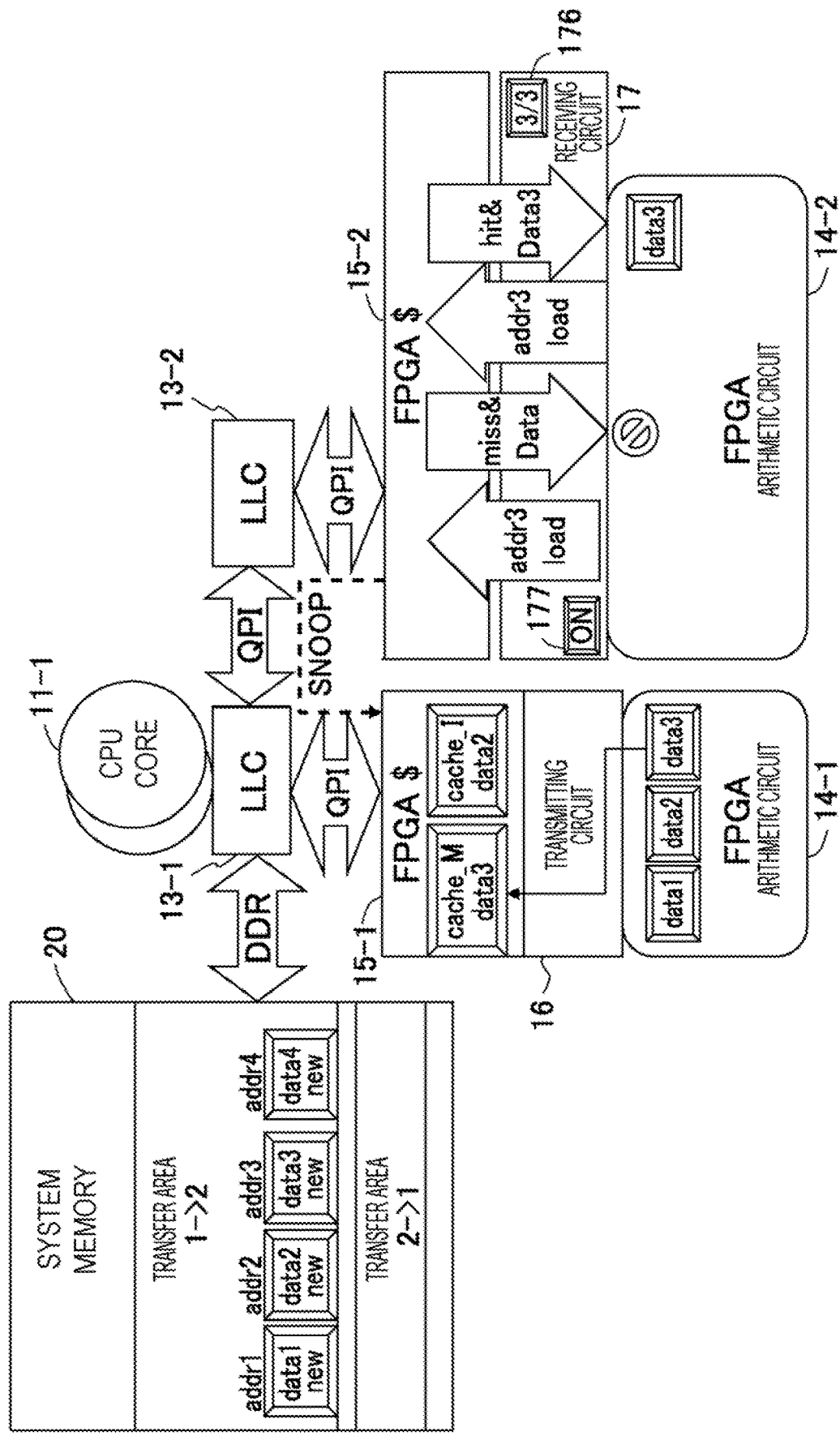
FIG. 15 is a diagram illustrating a state in which the last transfer data is acquired.

FIG. 15 illustrates a state in which the receiving circuit 17 (the transfer area polling circuit 172) has acquired the last transfer data item of the transfer size of transfer data (the three transfer data items) by repeatedly polling the reception-side FPGA cache 15-2. With this process, the transfer size of transfer data (the three transfer data items) is transferred from the FPGA arithmetic circuit 14-1 to the FPGA arithmetic circuit 14-2. Further, the transfer data is stored into the transfer area (from addr1 to addr3) of the system memory 20 through implicit write back. Further, one of the transfer data items in the transmission-side FPGA cache 15-1 illustrated as Modified (M) is set to Invalid (I) after the completion of implicit write back, thereby emptying the area for the transfer data item. Thereafter, the transfer size and the transfer flag in the system memory 20 are cleared. Further, the transfer size register 176 and the transfer flag register 177 of the receiving circuit 17 are also cleared to return to the state in FIG. 10.

Effects of First Embodiment

As described above, according to the first embodiment, the transmitting circuit 16 enables the FPGA arithmetic circuit 14-1 to transfer data to the FPGA arithmetic circuit 14-2 via the receiving circuit 17. According to the process of the first embodiment, in the first the data transfer process, the CPU 11 secures in the system memory 20 the transfer area corresponding to the maximum size of the transfer data. However, the transfer area in the system memory 20 only stores the transfer data written back thereto from the FPGA cache 15-1 through implicit write back when the transfer data set to Modified (M) in the FPGA cache 15-1 is read by the FPGA cache 15-2 through snooping. Therefore, the access to the transfer area in the system memory 20 involved in the data transfer is likely to be limited to a single access in implicit write back for each address. As compared with the consumption of the memory band in data transfer from the FPGA cache 15-1 to the FPGA cache 15-2 via the system memory 20, as in the comparative example, therefore, the consumption of the memory band is expected to be reduced by at least approximately half. In the information processing device 100 of the first embodiment, therefore, it is possible to transfer data from the FPGA cache 15-1 to the FPGA cache 15-2 while suppressing the consumption of the memory bus band of the system memory 20.

As described above, the empty cache managing circuit 163 acquires the empty capacity from the cache controller 15A-1 based on the number of areas (the number of cache blocks or cache lines) in the Invalid (I) state in the FPGA cache 15-1. Further, based on the address of the data in the system memory 20, the empty cache managing circuit 163 determines whether the data from the FPGA arithmetic circuit 14-1 is the transfer data to be transferred to the FPGA arithmetic circuit 14-2. If the data from the FPGA arithmetic circuit 14-1 is determined to be the transfer data in the above-described determination, the empty cache managing circuit 163 writes the transfer data to the areas of the FPGA cache 15-1 corresponding to the empty capacity. Meanwhile, for a memory transaction in which the data from the FPGA arithmetic circuit 14-1 is not the transfer data to be transferred to the FPGA arithmetic circuit 14-2, the transmitting circuit 16 performs control to keep the cache hint in the Invalid (I) state until the data transfer is completed. With this control, the transmitting circuit 16 restricts the purging of the transfer data from the FPGA cache 15-1 to the system memory 20. As described above, the transmitting circuit 16 is capable of transferring data from the FPGA cache 15-1 to the FPGA cache 15-2 while suppressing the consumption of the memory band with the use of the empty areas in the FPGA cache 15-1. The transmitting circuit 16 is also capable of accurately determining whether the data is the transfer data based on the address in the memory request.

Further, once having written the transfer data to all of the empty areas in the FPGA cache 15-1, the empty cache managing circuit 163 waits for the transfer data in the FPGA cache 15-1 to be cleared by implicit write back. Then, after the transfer data is cleared, the empty cache managing circuit 163 writes the remaining transfer data to the FPGA cache 15-1 by the amount corresponding to the capacity of the empty areas. The empty cache managing circuit 163 is therefore capable of transferring data from the FPGA cache 15-1 to the FPGA cache 15-2 while suppressing the consumption of the memory band of the system memory 20 with the use of the empty areas in the FPGA cache 15-1.

Further, in the first embodiment, the empty cache managing circuit 163 waits for the transfer data held in the FPGA cache 15-1 to be cleared through implicit write back by the cache controller 15A-2. Therefore, the information processing device 100 is capable of executing simple control with an existing protocol for maintaining the cache coherency.

Further, in the first embodiment, the reception-side transfer area polling circuit 172 accesses the FPGA cache 15-2 while counting up the head address of the transfer area. Then, if the transfer area polling circuit 172 receives a cache miss result, the transfer area polling circuit 172 accesses the FPGA cache 15-2 again by assuming that the transfer data has not been written to the FPGA cache 15-1 yet. Therefore, the information processing device 100 is capable of executing simple control with an existing protocol for maintaining the cache coherency.

In the first embodiment, the transmitting circuit 16 delivers the transfer size and the transfer flag to the receiving circuit 17 by using the predetermined address in the system memory 20. That is, the transmitting circuit 16 transfers the transfer data, the transfer size of which is likely to be increased, from the FPGA cache 15-1 to the FPGA cache 15-2 by using the system memory 20 as little as possible. Meanwhile, the transmitting circuit 16 is capable of executing simple delivery of management information, such as the transfer size and the transfer flag, to the receiving circuit 17 via the system memory 20.

The plurality of CPUs 11 are capable of accessing the system memories 20 via the transmission line such as QPI. Further, the respective FPGA arithmetic circuits 14 are capable of accessing the system memories 20 via the above-described transmission line. According to the procedure of the first embodiment, the transmitting circuit 16 is capable of delivering the management information, such as the transfer size and the transfer flag, to the corresponding CPU 11 regardless of the form of the applications executed by the plurality of CPUs 11.

Further, in the first embodiment, the securing of the transfer area in the system memory 20 in the first data transfer process and the setting of the transfer size are executed by the CPU 11. The first embodiment, therefore, enables data transfer suitable for the application program executed by the CPU 11 and data transfer tailored to individual application programs.

Second Embodiment

An information processing device 101 according to a second embodiment will be described below with reference to FIGS. 16 to 26. In the foregoing first embodiment, the transmitting circuit 16 acquires the empty capacity of the FPGA cache 15-1, writes the transfer data to the FPGA cache 15-1, and thereafter restricts the purging of the transfer data from the FPGA cache 15-1, that is, the replacement of data in the cache lines, until the transfer of the transfer data is completed. With such control, the information processing device 100 transfers data from the FPGA arithmetic circuit 14-1 to the FPGA arithmetic circuit 14-2 while suppressing the consumption of the memory band of the information processing device 100, and reduces the possibility of deterioration in the system performance associated with the consumption of the memory band.

In the information processing device 101 of the second embodiment, the transmitting circuit 16 is configured not to be able to acquire the empty capacity of the FPGA cache 15-1. In this case, the information processing device 101 of the second embodiment transfers data from the FPGA arithmetic circuit 14-1 to the FPGA arithmetic circuit 14-2 while suppressing the consumption of the memory band similarly as in the first embodiment. The components of the second embodiment are similar to those of the first embodiment except for the transmitting circuit 16, which is unable to acquire the empty capacity of the FPGA cache 15-1. Therefore, the components of the second embodiment the same as those of the first embodiment are assigned with the same signs, and description thereof will be omitted.

Figure 16:
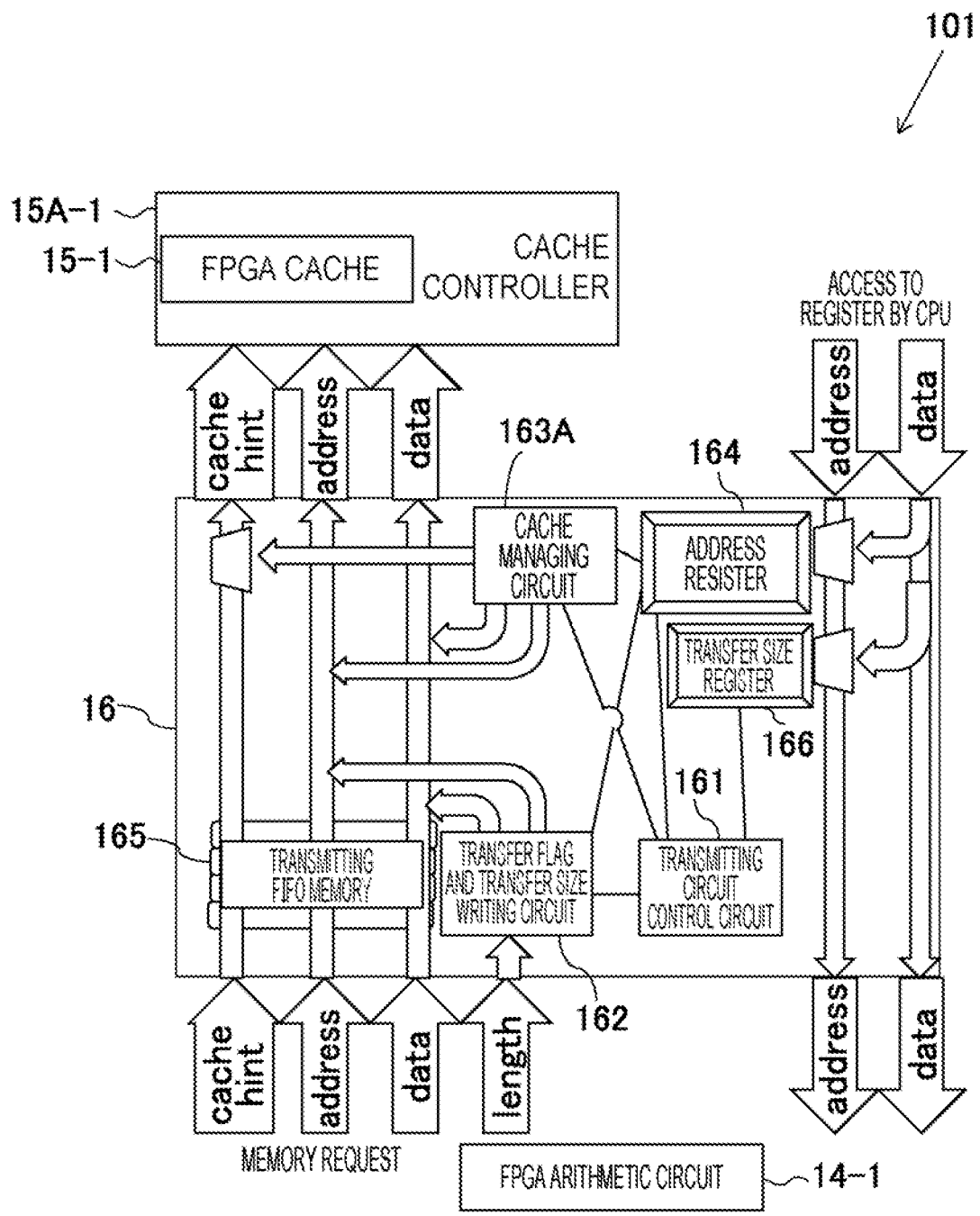
FIG. 16 is a diagram illustrating a configuration of a transmitting circuit of a second embodiment and data flow in the transmitting circuit.

FIG. 16 is a diagram illustrating a configuration of the transmitting circuit 16 of the information processing device 101 and data flow in the transmitting circuit 16. As in FIG. 16, the transmitting circuit 16 includes the transmitting circuit control circuit 161, the transfer flag and transfer size writing circuit 162, a cache managing circuit 163A, the address register 164, a transmitting first in, first out (FIFO) memory 165, and a transfer size register 166.

Among these components, the transmitting circuit control circuit 161, the transfer flag and transfer size writing circuit 162, and the address register 164 are similar in the configuration and function to those of the first embodiment, and thus description thereof will be omitted. The cache managing circuit 163A executes a process similar to that of the empty cache managing circuit 163 of the first embodiment except that the cache managing circuit 163A is unable to acquire the empty capacity from the transmission-side cache controller 15A-1.

That is, the cache managing circuit 163A is unable to identify the empty capacity of the FPGA cache 15-1. Therefore, each of the cache managing circuit 163A and the receiving circuit 17 executes the processing thereof on the assumption that a predetermined empty capacity (N empty areas, for example) is secured. The cache managing circuit 163A further transfers the transfer data to the receiving circuit 17 via the FPGA cache 15-1 by dividing a requested data transfer amount received from the FPGA arithmetic circuit 14-1 into parts each corresponding to the total capacity of the above-described N empty areas.

That is, the cache managing circuit 163A writes the transfer data to the FPGA cache 15-1 by a data amount corresponding to the capacity of the above-described N empty areas. If the FPGA cache 15-1 has no empty capacity in this case, the oldest (or least accessed) data at that point of time is purged from the FPGA cache 15-1. Thereafter, the cache managing circuit 163A performs control so that further data will not be written to the FPGA cache 15-1 until the data transfer is completed.

When the cache managing circuit 163A first writes the transfer data to the FPGA cache 15-1, therefore, the purging of data from the FPGA cache 15-1 and the storage of the data into the system memory 20 may occur. Once the transfer data is written to the FPGA cache 15-1 by the amount corresponding to a predetermined empty capacity (the N empty areas, for example), however, the transmitting circuit 16 restricts data writing to the FPGA cache 15-1 until the transfer of the written transfer data is completed. The transmitting circuit 16 then delivers the transfer data to the reception-side FPGA arithmetic circuit 14-2 in accordance with the protocol of maintaining the cache coherency between the FPGA caches 15-1 and 15-2.

The transmitting FIFO memory 165 holds the transfer data, which is requested to be transferred by the transmission-side FPGA arithmetic circuit 14-1, in units of the empty capacity. For example, it is assumed here that each of the transmitting circuit 16 and the receiving circuit 17 executes the data transfer process by assuming the predetermined empty capacity (the N empty areas, for example). In this case, the transmitting circuit control circuit 161 divides the transfer data requested to be transferred by the transmission-side FPGA arithmetic circuit 14-1 into data items each having a data size corresponding to the total capacity of the N empty areas, and stores the data items in the transmitting FIFO memory 165. For example, if the transfer data has a transfer size $M=N*k+n$ (wherein $n<N$), the transmitting circuit control circuit 161 divides the transfer data into transfer data items each having a data size corresponding to the total capacity of the N empty areas, and stores the transfer data items in k blocks of the transmitting FIFO memory 165 such that a transfer data item corresponding to n areas is stored in the last block. The cache managing circuit 163A then sequentially writes the transfer data items in the transmitting FIFO memory 165 to the FPGA cache 15-1, thereby delivering the transfer data to the receiving circuit 17 while suppressing the consumption of the memory band of the system memory 20 similarly as in the first embodiment.

The transfer size register 166 holds the data amount of transfer data currently being transferred. When the transfer size M is expressed as M=N*k+n (wherein n<N), the transfer size register 166 holds the value N during the transfer of data corresponding to the N areas (cache blocks or cache lines). Further, the transfer size register 166 holds the value n during the transfer of data corresponding to the last n areas (cache blocks or cache lines). The configuration of the receiving circuit 17 is similar to that of the first embodiment. On the assumption that the configuration of the receiving circuit 17 of the second embodiment is also illustrated in FIG. 5, therefore, description thereof will be omitted.

Figure 17:
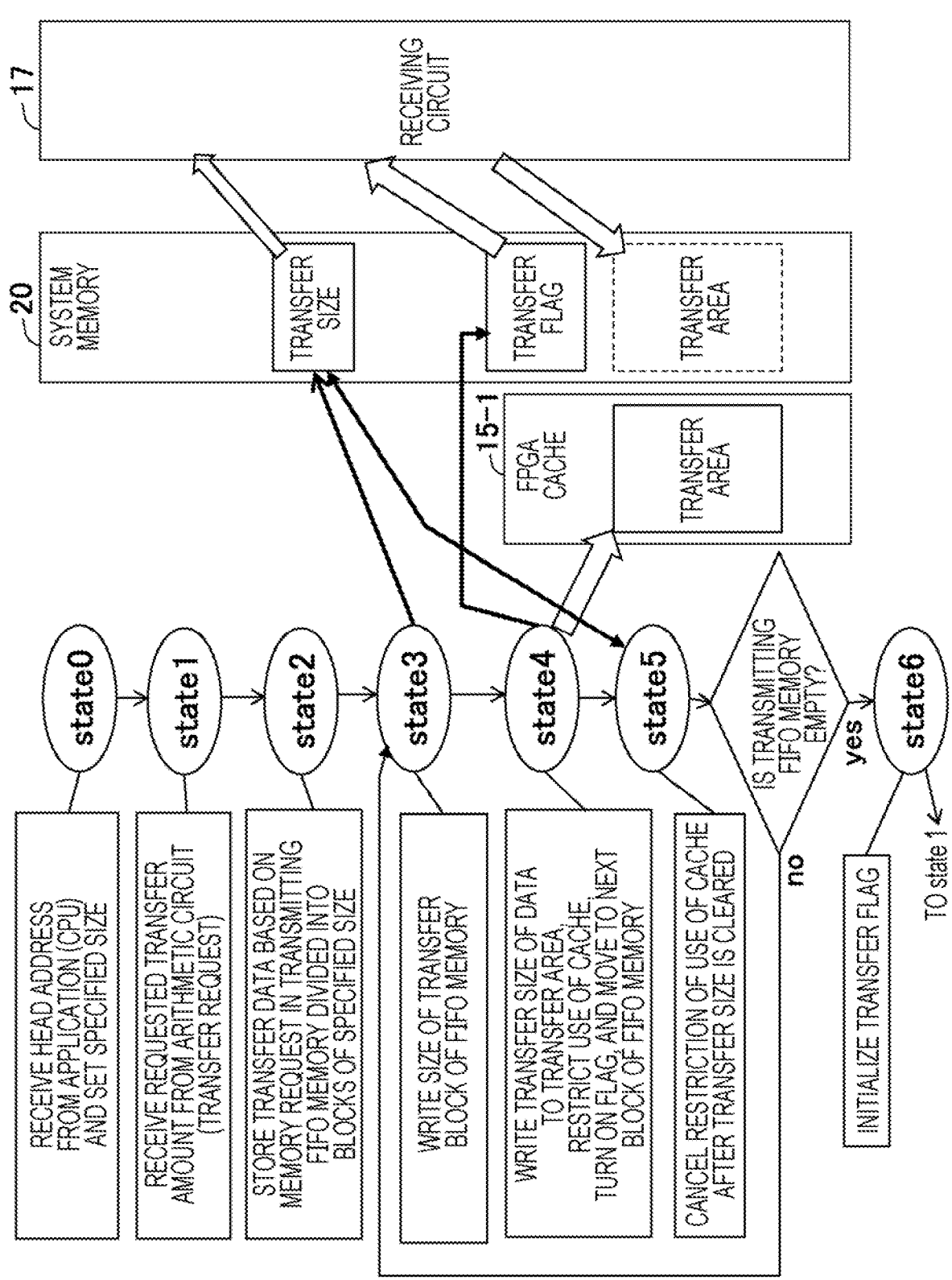
FIG. 17 is a sequence diagram illustrating a process of a transmitting circuit control circuit of the second embodiment.

FIG. 17 is a sequence diagram illustrating a process of the transmitting circuit control circuit 161 of the second embodiment. FIG. 17 illustrates the system memory 20 and the receiving circuit 17 as well as the sequence diagram. In an initial state (state 0), the transmitting circuit control circuit 161 waits to receive the head address of the transfer area secured in the system memory 20 from the CPU 11 executing the application program. After receiving the head address of the transfer area, the transmitting circuit control circuit 161 sets the transfer area in the address register 164. In this process, the transmitting circuit control circuit 161 further sets the size of the empty areas expected in the FPGA cache 15-1 (hereinafter referred to as the specified size) as the initial value of the transfer size in the system memory 20.

In the second embodiment, the transfer size set in the system memory 20 means the amount of data transferred from the FPGA cache 15-1 to the FPGA cache 15-2 in one transfer process. Further, in the second embodiment, the amount of data requested to be transferred by the FPGA arithmetic circuit 14-1 is divided into parts of the above-described specified size to execute the data transfer a plurality of times. Therefore, the transfer size set in state 0 is also understood as the initial value of the transfer size in the data transfer. The transfer size in the system memory 20 is written to the transfer size register 176 of the receiving circuit 17 in a procedure similar to that of the first embodiment. The transmitting circuit control circuit 161 then proceeds to state 1.

In state 1, the transmitting circuit control circuit 161 watts to receive the transfer request (referred to as the memory request) and the requested transfer amount from the FPGA arithmetic circuit 14-1. After receiving the requested transfer amount, the transmitting circuit control circuit 161 proceeds to state 2. In state 2, the transmitting circuit control circuit 161 stores the transfer data in the transmitting FIFO memory 165 based on the memory request from the FPGA arithmetic circuit 14-1. As described above, the transmitting FIFO memory 165 is divided into the blocks of the specified size corresponding to the N areas, for example. The transmitting circuit control circuit 161 then proceeds to state 3.

In state 3, the transmitting circuit control circuit 161 writes, at a predetermined address in the system memory 20, the amount of data in a transfer target block of the transmitting FIFO memory 165 as the transfer size. Herein, the transfer target block refers to one of the plurality of blocks of the transmitting FIFO memory 165 storing current transfer target data. If the amount of data in the transfer target block matches the initial value of the transfer size, however, the writing of the transfer size is unnecessary. The transfer size written in the system memory 20 is written to the transfer size register 176 of the receiving circuit 17 in a procedure similar to that of the first embodiment. The transmitting circuit control circuit 161 then proceeds to state 4. The transmitting circuit control circuit 161 executes the process of state 3 as an example of a control unit that acquires the data amount of the transmission data, and transfers the transmission data having the data amount to the second arithmetic unit via the first cache memory in units of a predetermined write amount. The transmitting circuit control circuit 161 executes the process of state 3 as an example of specifying in the memory the predetermined write amount of the transmission data to be written to the first cache memory.

In state 4, the transmitting circuit control circuit 161 writes the specified size of transfer data to the FPGA cache 15-1 via the cache managing circuit 163A. Then, the cache managing circuit 163A restricts further writing to the FPGA cache 15-1. The transmitting circuit control circuit 161 then moves to the next block of the transmitting FIFO memory 165. The transmitting circuit control circuit 161 further writes the transfer flag in the ON state at the predetermined address in the system memory 20. The transfer flag written in the system memory 20 is written to the transfer flag register 177 of the receiving circuit 17 in a procedure similar to that of the first embodiment. The transmitting circuit control circuit 161 then proceeds to state 5. The transmitting circuit control circuit 161 executes the process of state 4 as an example of restricting the use of the first cache memory after the transmission data is written to the first cache memory by the writing unit. Further, the transmitting circuit control circuit 161 executes the process of state 4 as an example of writing the transmission data to the first cache memory by the predetermined write amount and restricting the use of the first cache memory.

In response to the process of the transmitting circuit 16 in state 4, and after the transfer flag in the ON state is written to the transfer flag register 177, the receiving circuit 17 (the transfer area polling circuit 172) reads the transfer data from the FPGA cache 15-2 based on the head address of the transfer area set in the address register 174. If the transfer data is hit in the FPGA cache 15-2, the reading of the transfer data succeeds, and thus the address is moved to the next area. If a cache miss of the transfer data occurs in the FPGA cache 15-2, the receiving circuit 17 (the transfer area polling circuit 172) executes again the reading of the transfer data from the FPGA cache 15-2 with the same address. Further, after acquiring the transfer size of transfer data, the receiving circuit control circuit 171 of the receiving circuit 17 dears the transfer size in the system memory 20.

In state 5, the transmitting circuit control circuit 161 waits for the transfer size set at the predetermined address in the system memory 20 to be cleared. After the transfer size set at the predetermined address in the system memory 20 is cleared, the transmitting circuit control circuit 161 cancels the restriction of the use of the FPGA cache 15-1. The transmitting circuit control circuit 161 further determines whether the transmitting FIFO memory 165 is empty. If the transmitting FIFO memory 165 is not empty, the transmitting circuit control circuit 161 returns to state 3 to repeat the processes of state 3 and the subsequent states from the next block of the transmitting FIFO memory 165. If the transmitting FIFO memory 165 is empty, the transmitting circuit control circuit 161 returns to state 1 to wait for the memory request from the FPGA arithmetic circuit 14-1. The transmitting circuit control circuit 161 executes the process of state 5 as an example of canceling the restriction of the use of the first cache memory after the transmission data is read. Further, the transmitting circuit control circuit 161 executes the process of state 5 as an example of detecting the completion of reading of the transmission data in the second arithmetic unit, and canceling the restriction of the use of the first cache memory after the completion of the reading is detected.

The sequence of the process of the receiving circuit 17 is substantially similar to that of the first embodiment illustrated in FIG. 8, and thus description thereof will be omitted. In state 5, however, the receiving circuit control circuit 171 clears the transfer size in the system memory 20, as described above, as well as the clearing of the transfer size register 176 and the transfer flag register 177.

Figure 18:
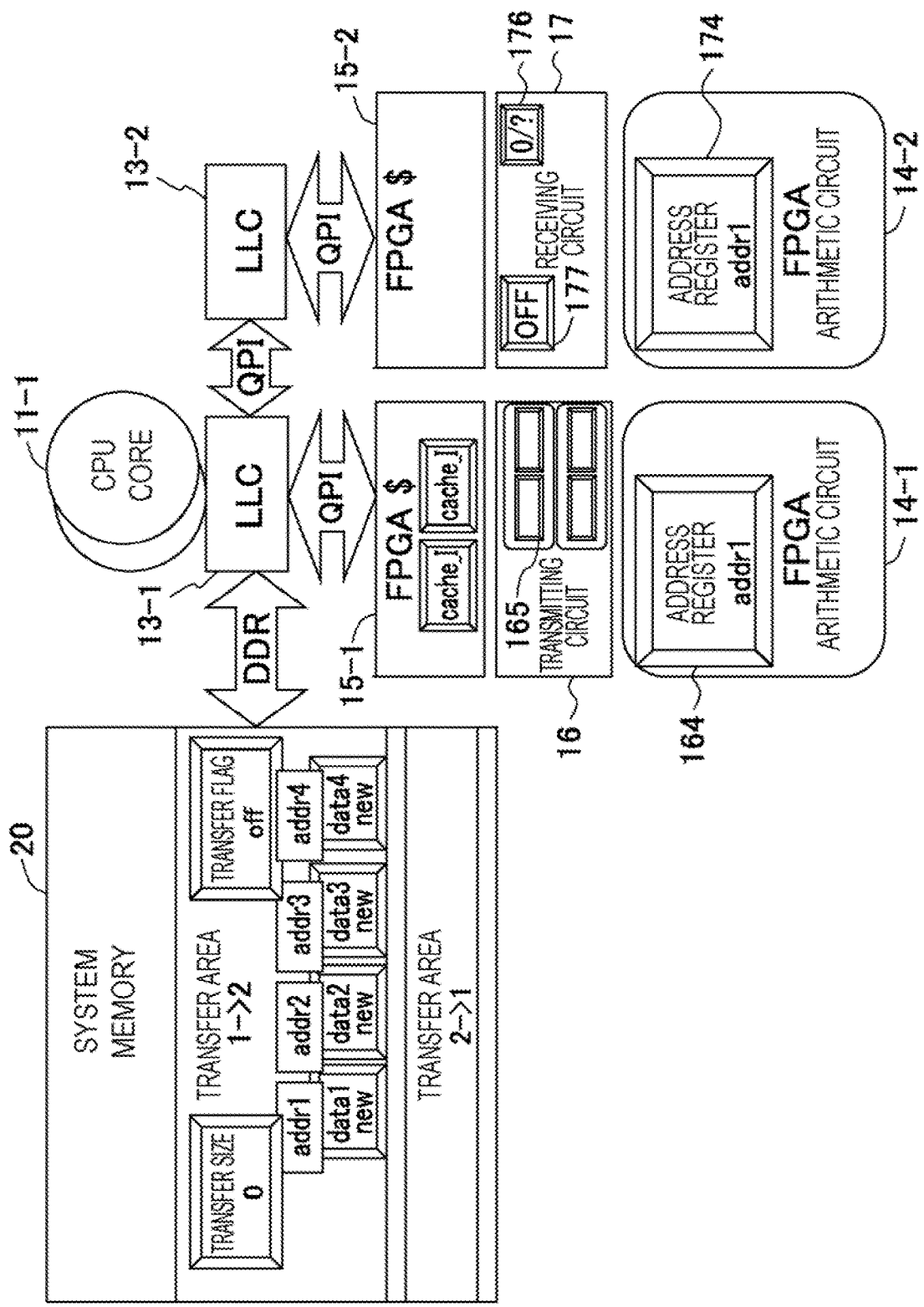
FIG. 18 is a diagram illustrating a state in which the transmitting circuit control circuit has received a head address of the transfer area.

FIG. 18 illustrates a state in which the transmitting circuit control circuit 161 has received the head address of the transfer area in state 0. In this example, four areas (addr1 to addr4) are secured in the system memory 20 as the transfer area. Further, in the second embodiment, the transmission-side address register 164 is provided in the FPGA arithmetic circuit 14-1, and the head address (addr1) of the transfer area in the system memory 20 is written in the address register 164. Further, the reception-side address register 174 is provided in the FPGA arithmetic circuit 14-2, and the head address (addr1) of the transfer area in the system memory 20 is written in the address register 174. Further, in the example of FIG. 18, the data transfer process is to be executed on the assumption that there are two empty areas in each of the FPGA caches 15-1 and 15-2. That is, the specified size of the FPGA cache 15-1 for use in the data transfer is determined to correspond to two areas (cache blocks or cache lines). In state 0, the transfer size in the system memory 20 is 0, and the transfer flag is OFF.

Figure 19:
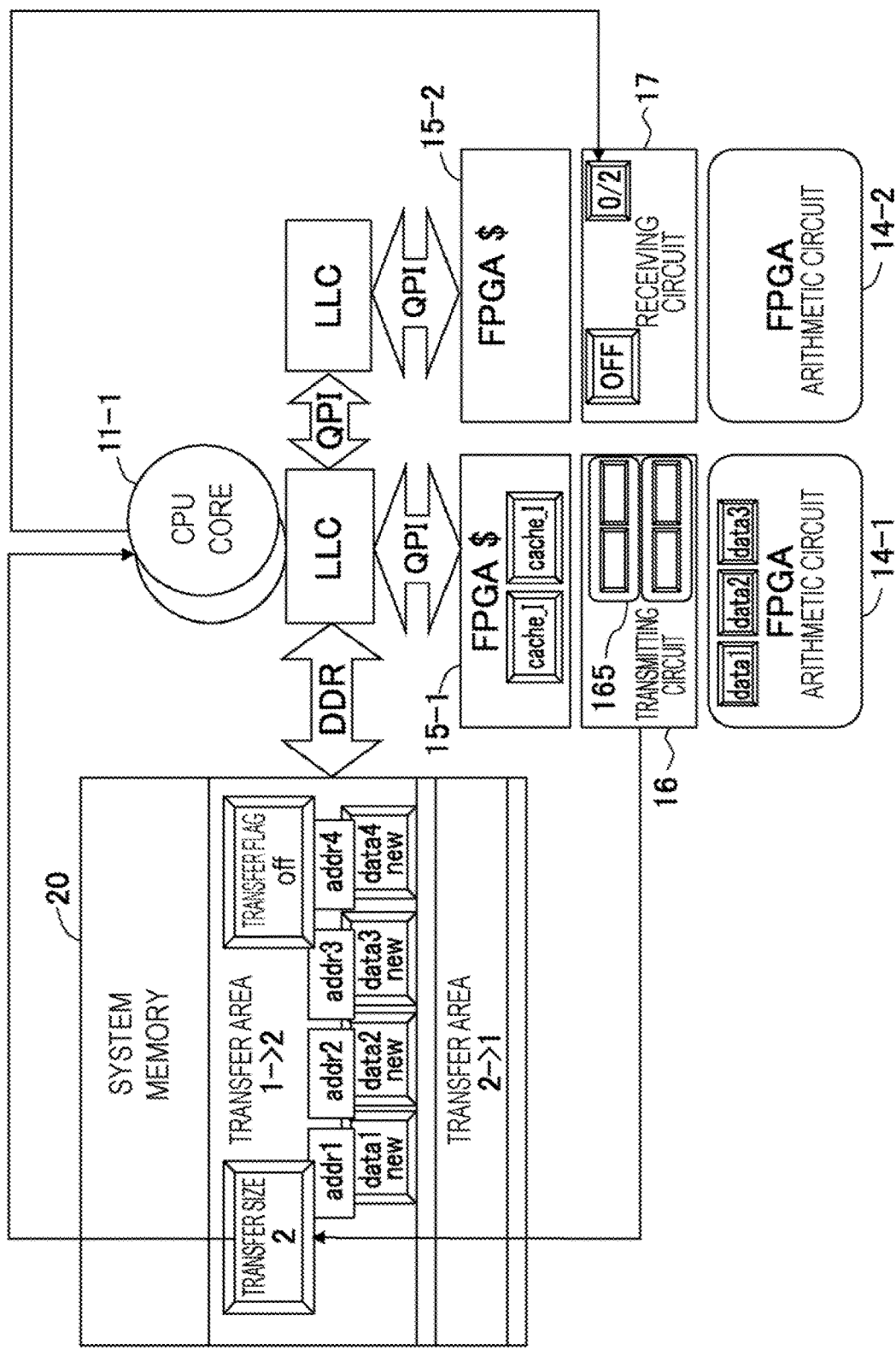
FIG. 19 is a diagram illustrating a state in which an initial value of the transfer size is set in the system memory.

Since the specified size is determined to correspond to two areas in the FPGA cache 15-1, FIG. 19 illustrates a state in which the initial value of the transfer size is set to two in the system memory 20. The transfer size in the system memory 20 is read by polling and written to the transfer size register 176 of the receiving circuit 17 by the CPU 11-1, for example, similarly as in the first embodiment. The transfer size in the system memory 20, however, may be read by polling and written to the transfer size register 176 by the receiving circuit control circuit 171.

Figure 20:
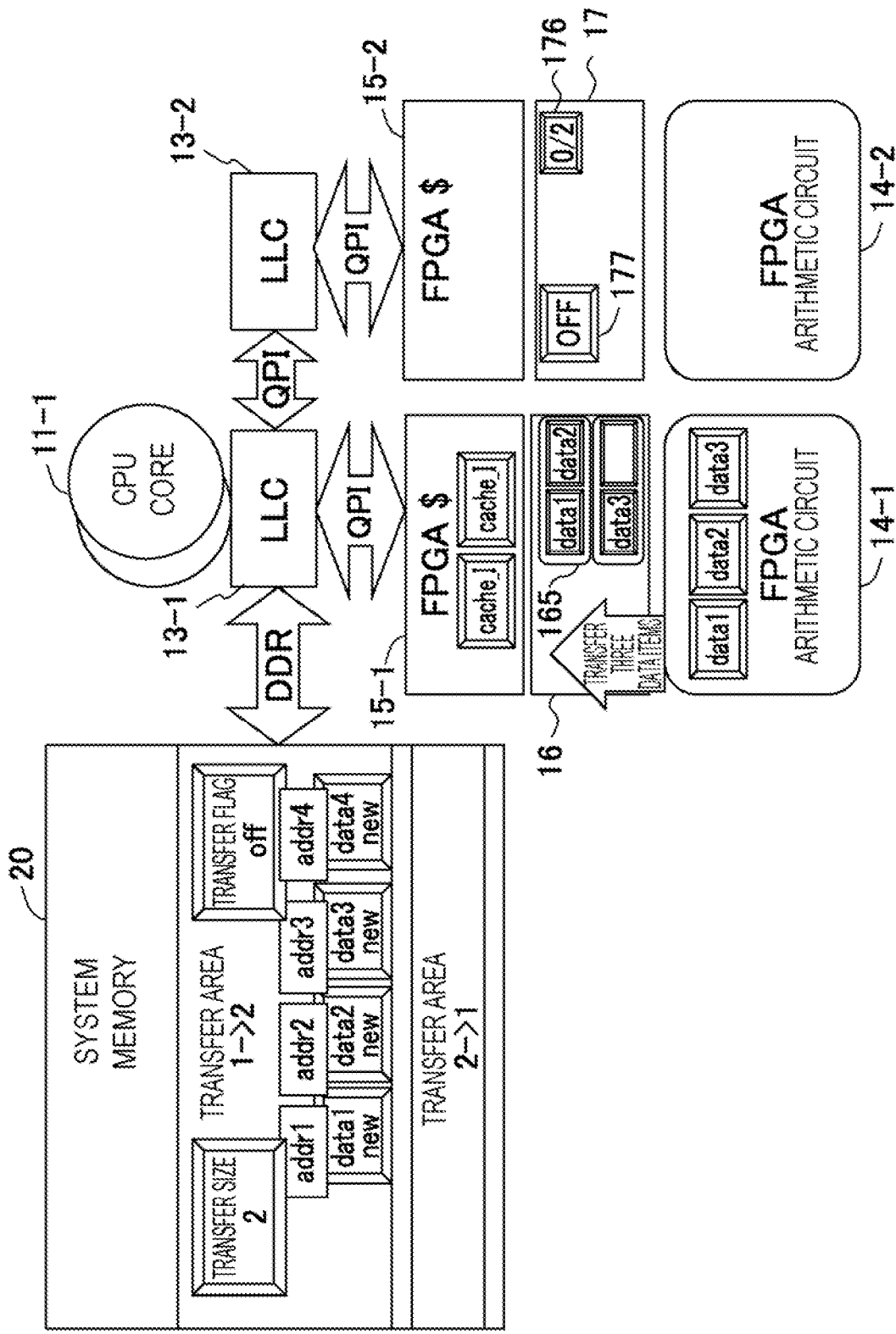
FIG. 20 illustrates an example of a process in which an FPGA arithmetic circuit has notified a requested transfer amount as a memory request.

FIG. 20 illustrates an example of a process in which the FPGA arithmetic circuit 14-1 has notified a requested transfer amount corresponding to three areas as the memory request. The initial value of the transfer size is assumed to correspond to two areas in the FPGA cache 15-1 (the areas of the specified size), as in FIG. 19. If the requested transfer amount in the memory request from the FPGA arithmetic circuit 14-1 exceeds the specified value, the transmitting circuit control circuit 161 divides the transfer data into data items of the specified value, stores the data items in the blocks of the transmitting FIFO memory 165, and executes the data transfer a plurality of times.

Figure 21:
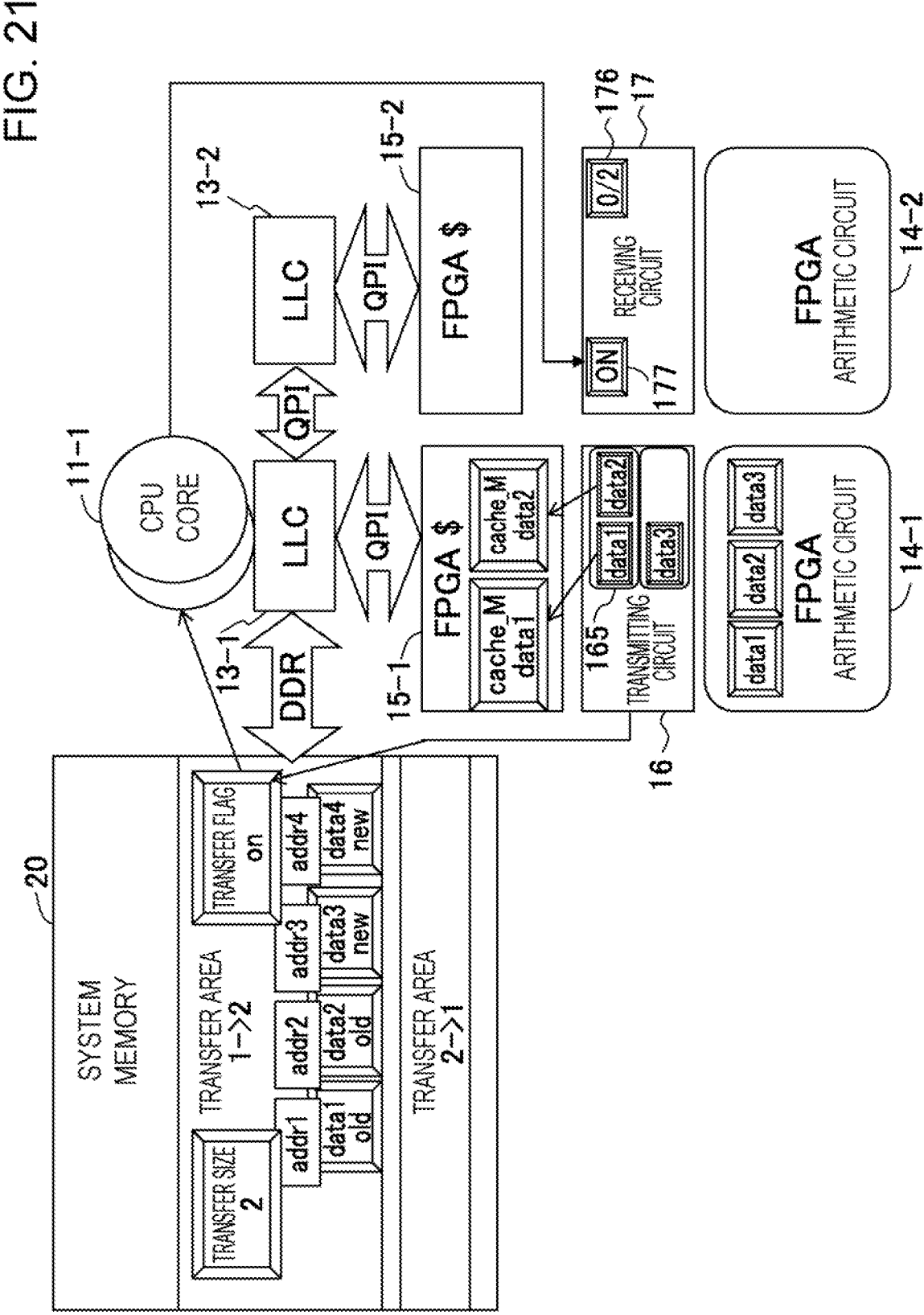
FIG. 21 is a diagram illustrating a state in which a specified size of transfer data is written.

FIG. 21 illustrates a state in which the transmitting circuit control circuit 161 has written the specified size of transfer data to the FPGA cache 15-1 via the cache managing circuit 163A in state 4. Herein, the address of the transfer area is added up from the head of the transfer area (the value in the address register 164) for the next data writing. The transmitting circuit control circuit 161 further sets the transfer flag in the system memory 20 to the ON state. Thereafter, the transmitting circuit control circuit 161 performs control such that the cache hint is set to Invalid (I) in subsequent memory requests until the completion of the data transfer to keep the data held in the FPGA cache 15-1 from being purged therefrom.

Figure 22:
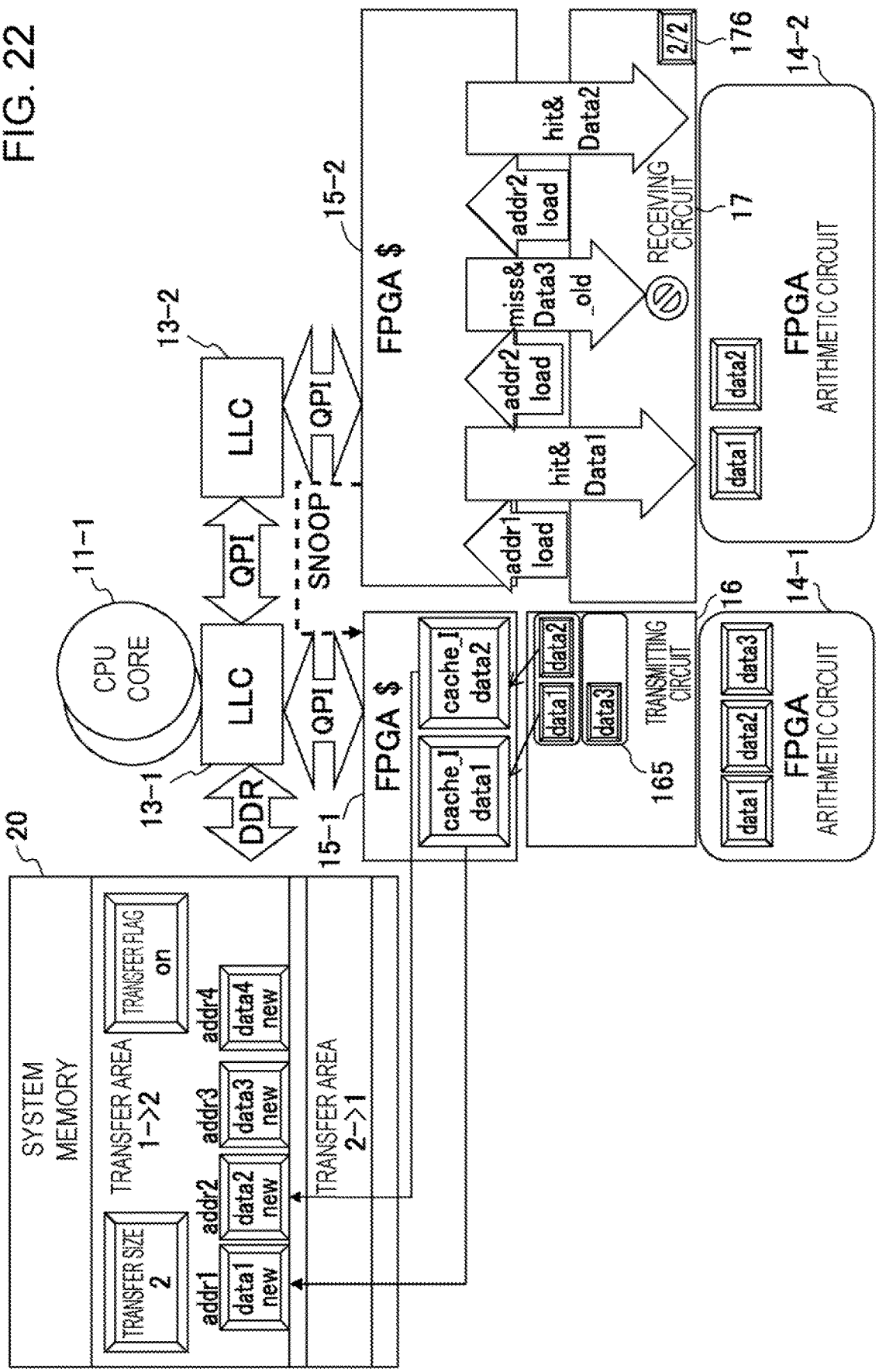
FIG. 22 is a diagram illustrating a process of the receiving circuit.

FIG. 22 is a diagram illustrating a process performed by the receiving circuit 17 in response to the process of the transmitting circuit 16 in state 4. When the transfer flag is set to the ON state in the system memory 20, the CPU 11-1 reads the transfer flag in the ON state from the system memory 20, and writes the transfer flag to the transfer flag register 177 of the receiving circuit 17. The transfer flag in the ON state, however, may be read by the receiving circuit control circuit 171 through polling the system memory 20. When the transfer flag register 177 is turned on, the transfer area polling circuit 172 accesses the FPGA cache 15-2 and reads the transfer data therefrom based on the head address of the transfer area defined in the address register 174.

If the transfer data is hit in the FPGA cache 15-2 with the accessed address, the reading of the transfer data with the address succeeds. Therefore, the transfer area polling circuit 172 counts up the address register 174 and moves to the next address to continue to read the transfer size of transfer data. In this process, the number of read transfer data items is counted in the transfer size register 176. Further, if a cache miss of the transfer data occurs in the FPGA cache 15-2 with the accessed address, the reading of the transfer data with the address fails. The cache miss means that the transmitting circuit 16 has not written the transfer data to the FPGA cache 15-1 yet. The transfer area polling circuit 172 therefore accesses the FPGA cache 15-2 again with the address. In FIG. 22, the second access to data2 succeeds, and the count value of received transfer data items in the transfer size register 176 turns to 2/2. Thereby, the transfer is completed.

Figure 23:
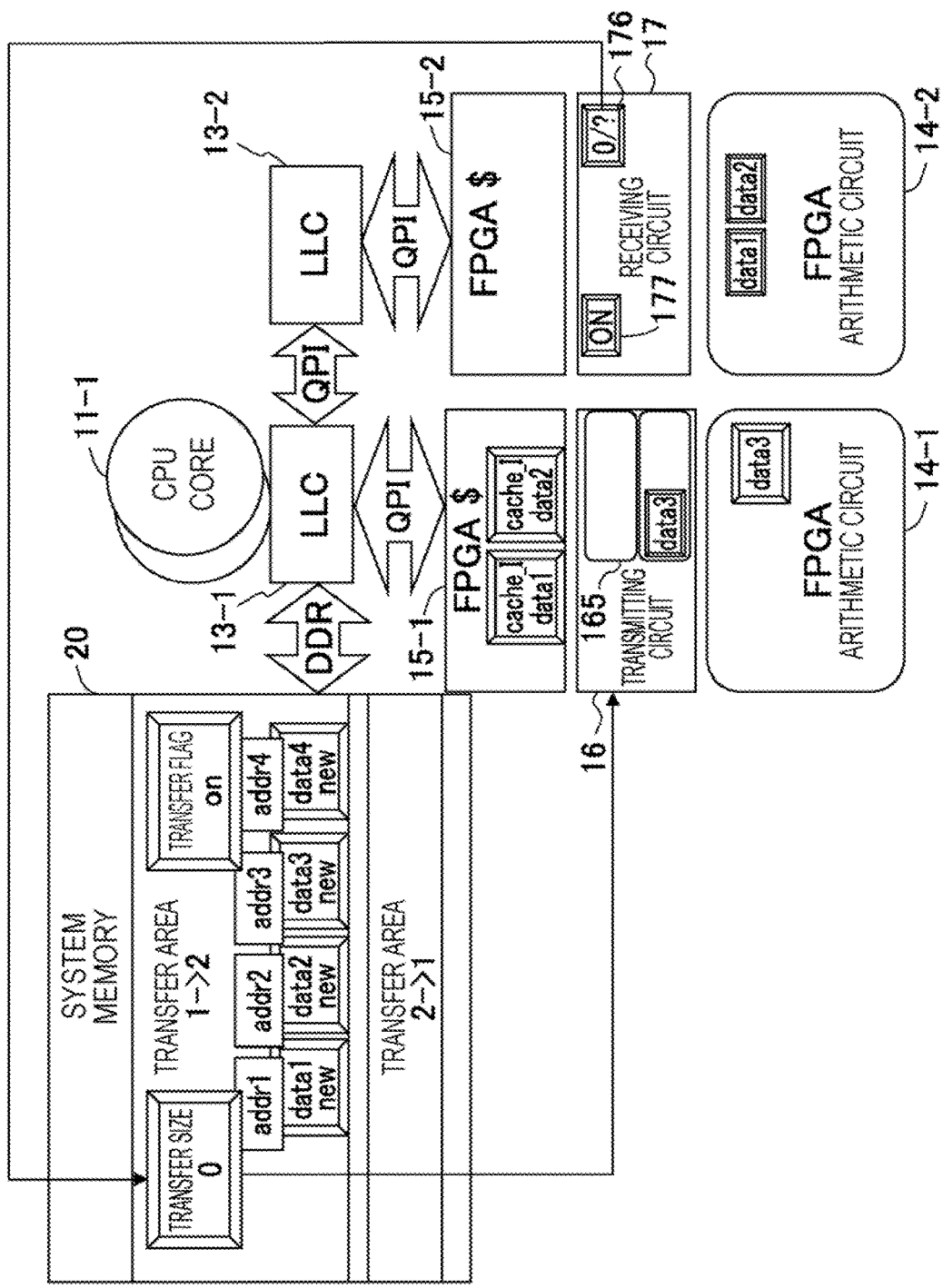
FIG. 23 is a diagram illustrating a state in which the receiving circuit control circuit has cleared the transfer size set at a predetermined address in the system memory.

FIG. 23 illustrates a state in state 5, in which the receiving circuit control circuit 171 has cleared the transfer size set at the predetermined address in the system memory 20. With the transfer size in the system memory 20 cleared, the transmitting circuit control circuit 161 recognizes the completion of the transfer of the transfer data written in the FPGA cache 15-1 (the above-described two data items data1 and data2). The transmitting circuit control circuit 161 therefore attempts to transfer the remaining one data item (data3) to the FPGA arithmetic circuit 14-2. Therefore, the transmitting circuit control circuit 161 proceeds to state 3. In this process, the transfer flag is kept in the ON state. Although omitted in FIG. 23, the address register 174 of the receiving circuit 17 is counted up to the next address of the transfer area.

As described above, in the second embodiment, the transmitting circuit control circuit 161 recognizes the completion of the transfer of the transfer data written in the FPGA cache 15-1 (the above-described two data items data1 and data2) when the transfer size in the system memory 20 is cleared. This is because the transmitting circuit control circuit 161 of the second embodiment is unable to recognize the empty capacity of the FPGA cache 15-1. In the information processing device 101 of the second embodiment, therefore, the areas for the transfer data in the FPGA cache 15-1 do not have to be changed from the Modified (M) state to the Invalid (I) state by implicit write back. That is, the FPGA cache 15-1 does not demand the implicit write back function.

Figure 24:
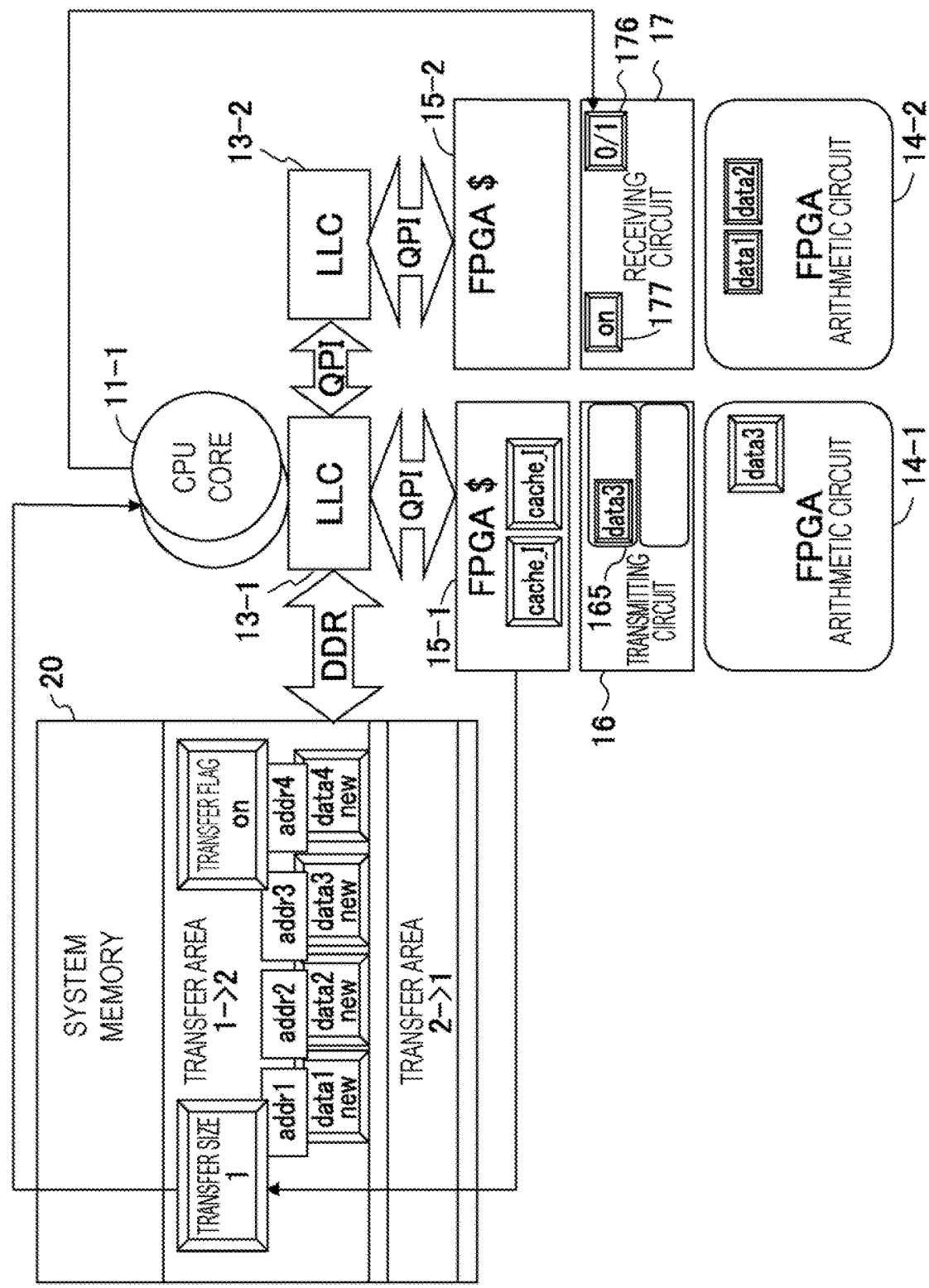
FIG. 24 is a diagram illustrating a state in which the transfer size is set in the system memory to transfer the remaining data.

FIG. 24 illustrates a state in which the transmitting circuit control circuit 161 has returned to state 3 and set the transfer size in the system memory 20 to one to transfer the remaining data item (data3) in the transmitting FIFO memory 165. The transfer size in the system memory 20 is set as 0/1 in the transfer size register 176 of the receiving circuit 17 by the CPU 11-1 or the receiving circuit control circuit 171 similarly as described above.

Figure 25:
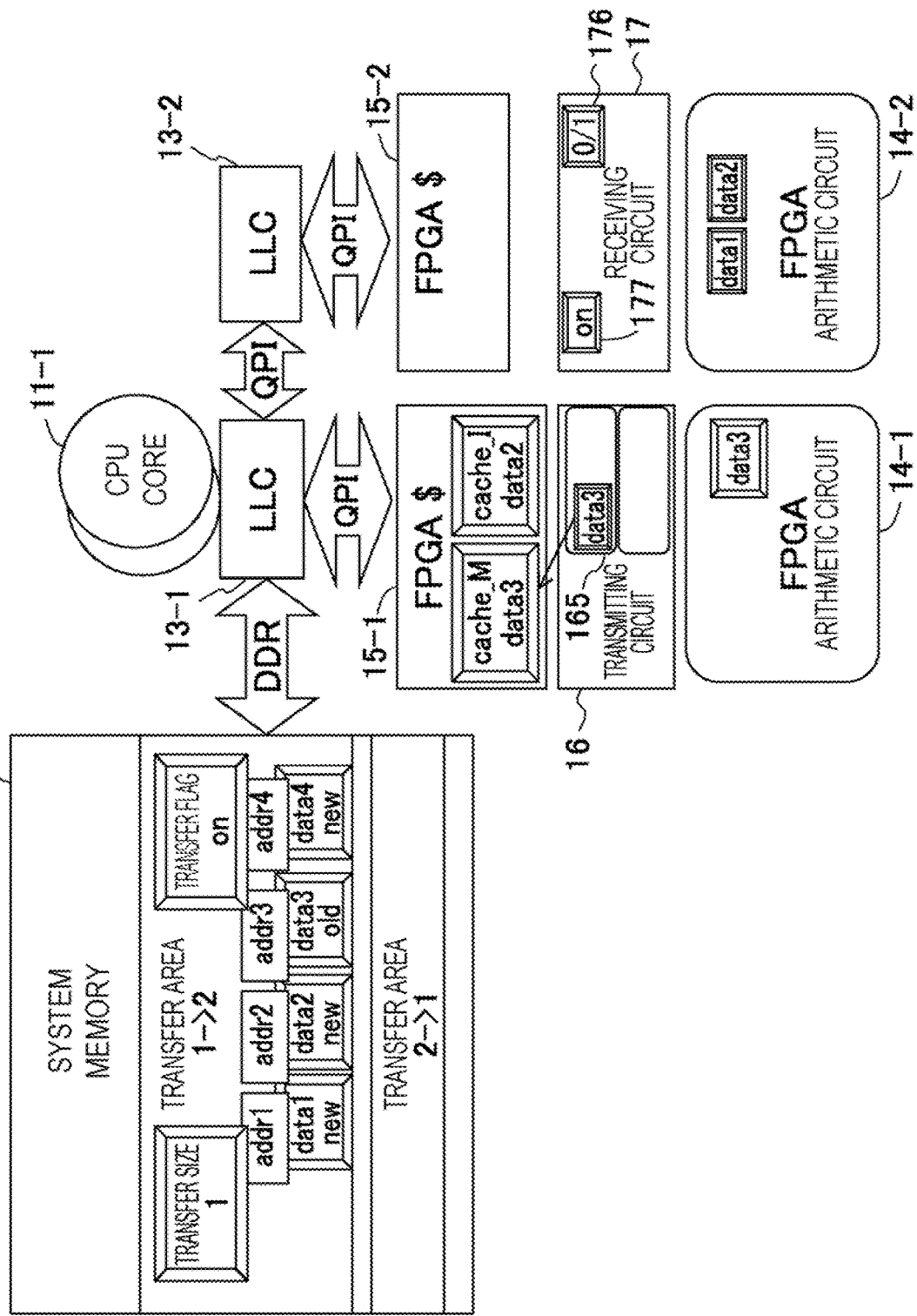
FIG. 25 is a diagram illustrating a state in which the remaining data is written to an FPGA cache.

FIG. 25 illustrates a state in which the remaining data item (data3) in the transmitting FIFO memory 165 is written to the FPGA cache 15-1 in state 4. Herein, the transfer area polling circuit 172 of the receiving circuit 17 accesses the FPGA cache 15-2 and reads the transfer data therefrom based on the counted-up address of the transfer area (in the address register 174) similarly as in FIG. 22.

Figure 26:
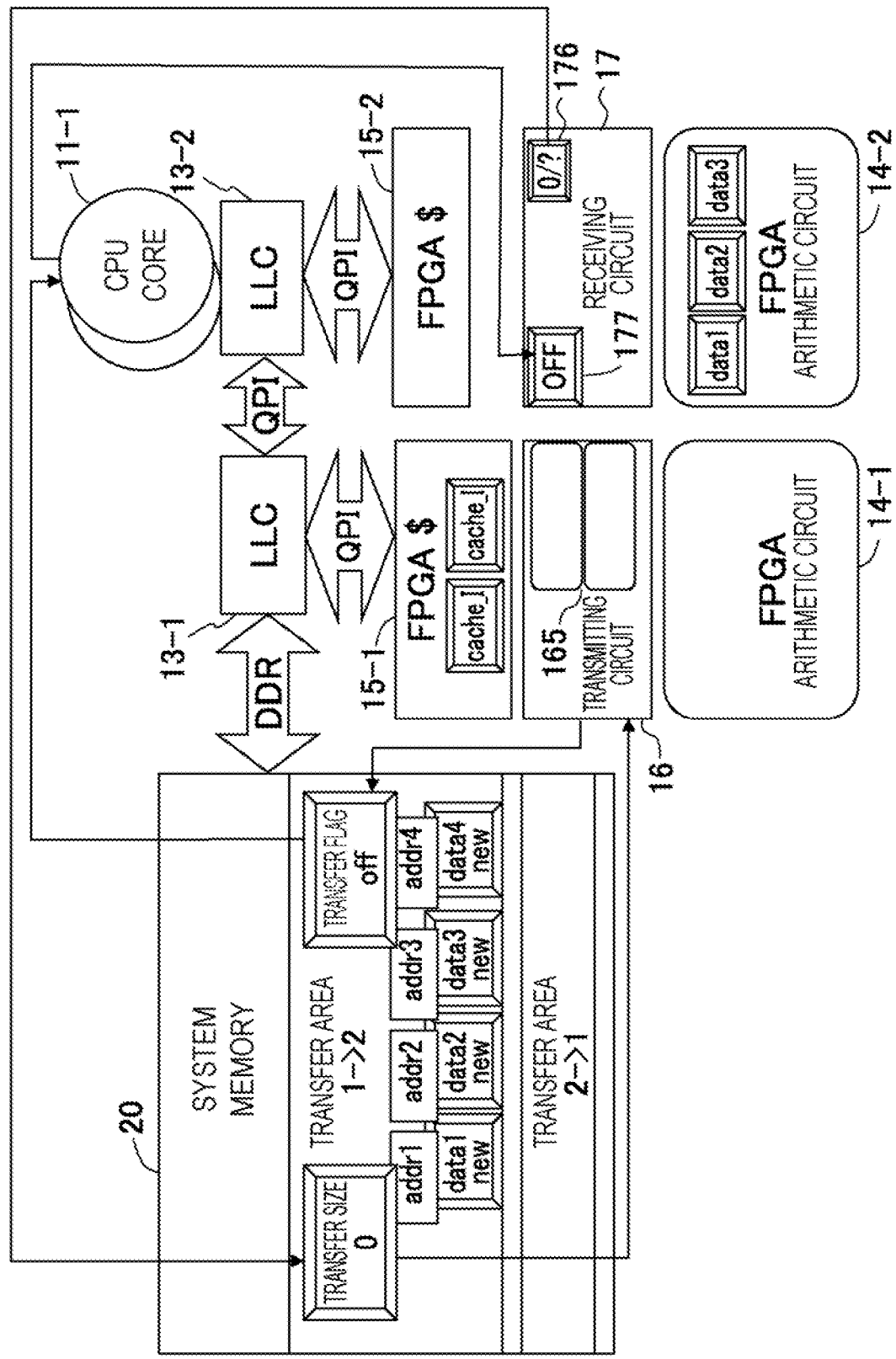
FIG. 26 is a diagram illustrating a process of clearing a transfer flag after a transmitting FIFO memory is emptied.

FIG. 26 illustrates a process in which the transmitting circuit control circuit 161 dears the transfer flag in state 6 after the transmitting FIFO memory 165 is emptied in state 5. As described above, after the receiving circuit 17 (the transfer area polling circuit 172) reads the remaining transfer data from the FPGA cache 15-2, the receiving circuit control circuit 171 clears the transfer size in the system memory 20. Since all of the data in the transmitting FIFO memory 165 has been transmitted, the transmitting circuit control circuit 161 clears the transfer flag in the system memory 20. After the transfer flag is cleared, the transfer flag register 177 is read and cleared by the CPU 11-1 or the receiving circuit control circuit 171. Thereby, the data transfer is completed.

Effects of Second Embodiment

As described above, with the specified amount (the data amount for one transfer process) specified by the transmitting circuit 16, it is possible to execute the data transfer via the FPGA caches 15 similarly as in the first embodiment, even if the transmitting circuit 16 is unable to acquire the empty capacity of the FPGA cache 15-1. The transmitting circuit 16 writes the specified amount of transfer data to the FPGA cache 15-1, and thereafter performs control such that the cache hint is set to Invalid (I) in memory transactions to the FPGA cache 15-1. According to the above-described procedure, even if data purging from the FPGA cache 15-1 occurs while the transfer data is written to the FPGA cache 15-1 by the data amount for one transfer process, any further purging is avoidable. Accordingly, the configuration and process of the second embodiment also enable the data transfer from the FPGA arithmetic circuit 14-1 to the FPGA arithmetic circuit 14-2 while suppressing the consumption of the memory band of the system memory 20.

In the process of the second embodiment, control may be performed such that the cache hint is set to Invalid (I) in memory transactions after the transfer data is written to the FPGA cache 15-1 by the data amount for one transfer process. In the second embodiment, therefore, it is unnecessary to determine in each transfer process whether the current transfer process is the data transfer to the FPGA arithmetic circuit 14-2 from the address included in the memory request from the FPGA arithmetic circuit 14-1, unlike in the first embodiment. That is, the transmitting circuit 16 (the transmitting circuit control circuit 161) may set the cache hint to Invalid (I) in the memory transactions during the time from the writing of the transfer data to the FPGA cache 15-1 to the completion of the data transfer. Further, the transmitting circuit control circuit 161 may directly deliver the cache hint included in the memory request from the FPGA arithmetic circuit 14-1 to the FPGA cache 15-1 after the transfer of the transfer data is completed. Such a process enables the transmitting circuit control circuit 161 to simplify the writing of the transfer data to the FPGA cache 15-1, the restriction of the purging of the transfer data from the FPGA cache 15-1, and the cancellation of the restriction of the purging after the completion of the data transfer. That is, the transmitting circuit control circuit 161 is capable of transferring data from the FPGA arithmetic circuit 14-1 to the FPGA arithmetic circuit 14-2 with simple control.

Other Embodiments

In the foregoing first and second embodiments, examples of the data transfer from the FPGA arithmetic circuit 14-1 to the FPGA arithmetic circuit 14-2 have been described. However, the FPGA arithmetic circuits 14 performing the data transfer are not limited to a pair of FPGA arithmetic circuits 14. That is, the number of the FPGA arithmetic circuits 14 performing the data transfer may be any number equal to or greater than 2.

Figure 27:
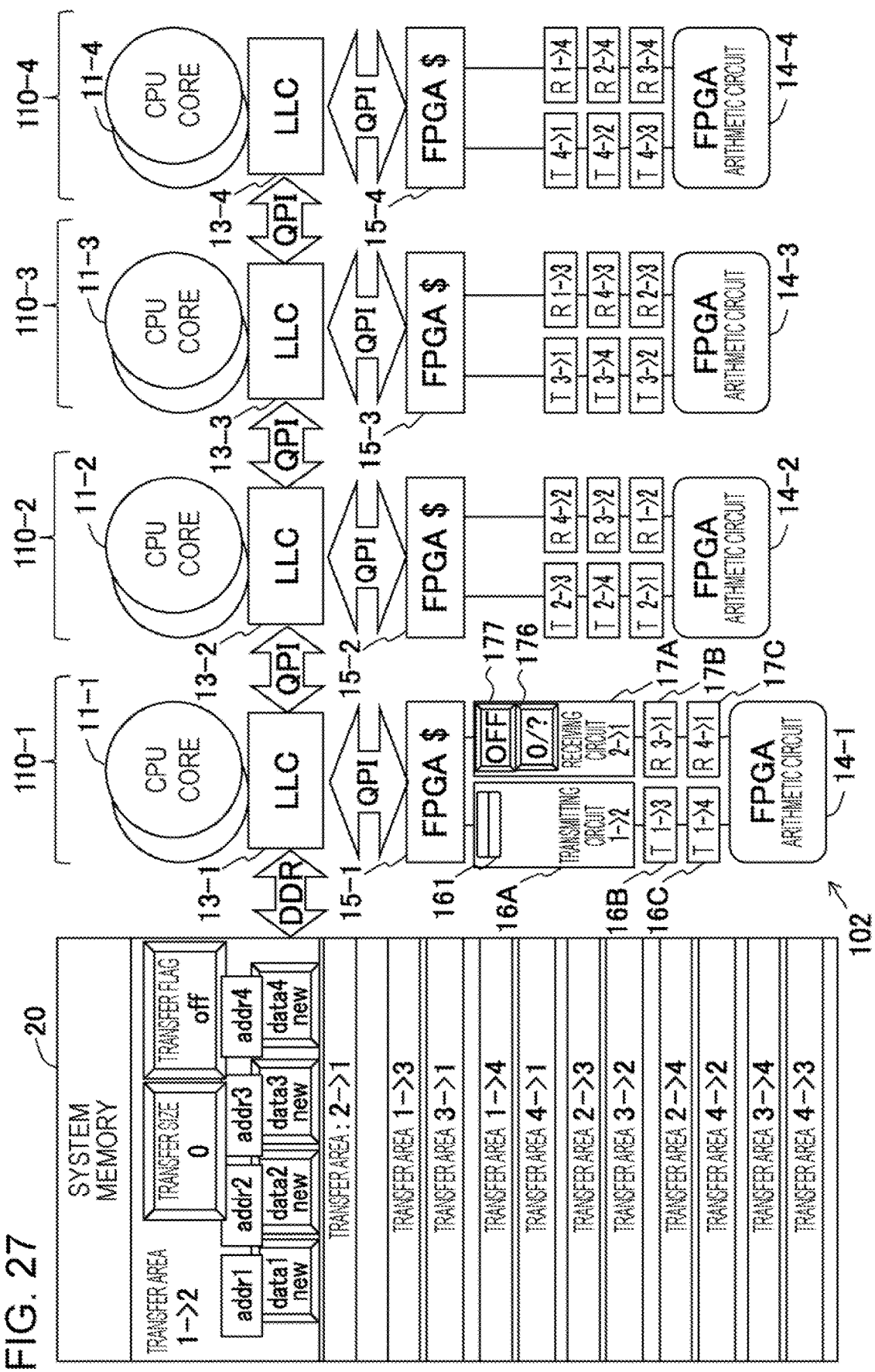
FIG. 27 is a diagram illustrating a configuration of an information processing device that transfers data between four FPGA arithmetic circuits.

FIG. 27 illustrates a configuration of an information processing device 102 that transfers data between four FPGA arithmetic circuits 14-1, 14-2, 14-3, and 14-4. As in FIG. 27, the information processing device 102 includes packages 110-1, 110-2, 110-3, and 110-4, and the system memory 20. Further, for example, the package 110-1 includes the CPU 11-1, the LLC 13-1, the FPGA cache 15-1, transmitting circuits 16A, 16B, and 16C, receiving circuits 17A, 17B, and 17C, and the FPGA arithmetic circuit 14-1. In the package 110-1, the LLC 13-1 and the FPGA cache 15-1 are connected by the transmission line such as QPI, for example. In FIG. 27, the local cache 12 (see FIG. 3) on the side of the CPU 11-1 is omitted. The configuration of each of the packages 110-2, 110-3, and 110-4 is similar to that of the package 110-1.

The packages 110-1 to 110-4 are connected to each other by the transmission line such as QPI. Further, the packages 110-1 to 110-4 and the system memory 20 are connected by the memory bus conforming to the specifications of a standard such as DDR.

The CPU 11-1 secures the transfer areas 1->2 and 2->1 in the system memory 20. The transfer area 1->2 is used in data transfer from the FPGA arithmetic circuit 14-1 to the FPGA arithmetic circuit 14-2. In the transfer area 1->2, the address of the first transfer data is addr1, and the address of the last transfer data is addr4, for example. Further, the transfer area 1->2 includes areas for storing the transfer size and the transfer flag as well as the areas for the transfer data. The configuration of the transfer area 2->1 is similar to that of the transfer area 1->2.

The other CPUs 11 similarly secure in the system memory 20 transfer areas 1->3 and 3->1, transfer areas 1->4 and 4->1, transfer areas 2->3 and 3->2, transfer areas 2->4 and 4->2, and transfer areas 3->4 and 4->3, which are used in data transfer between the FPGA arithmetic circuits 14-1 and 14-3, data transfer between the FPGA arithmetic circuits 14-1 and 14-4, data transfer between the FPGA arithmetic circuits 14-2 and 14-3, data transfer between the FPGA arithmetic circuits 14-2 and 14-4, and data transfer between the FPGA arithmetic circuits 14-3 and 14-4, respectively.

The configuration of each of the transmitting circuits 16A, 16B, and 16C is similar to that of the transmitting circuit 16 of the first or second embodiment, for example. For instance, each of the transmitting circuits 16A, 16B, and 16C includes components such as the transmitting circuit control circuit 161 and the transmitting FIFO memory 165. Further, the configuration of each of the receiving circuits 17A, 17B, and 17C is similar to that of the receiving circuit 17 of the first and second embodiments, for example. For instance, each of the receiving circuits 17A, 17B, and 17C includes components such as the receiving circuit control circuit 171, the transfer size register 176, the transfer flag register 177, and the transfer area polling circuit 172.

The transmitting circuit 16A and the receiving circuit 17A control the data transfer from the FPGA arithmetic circuit 14-1 to the FPGA arithmetic circuit 14-2. The transmitting circuit 16B and the receiving circuit 178 control the data transfer from the FPGA arithmetic circuit 14-1 to the FPGA arithmetic circuit 14-3. The transmitting circuit 16C and the receiving circuit 17C control the data transfer from the FPGA arithmetic circuit 14-1 to the FPGA arithmetic circuit 14-4.

The transfer areas 1->2, 2->1, 1->3, 3->1, 1->4, and 4->1 are secured at different addresses in the system memory 20. The transmitting circuits 16A, 16B, and 16C and the receiving circuits 17A, 17B, and 17C are therefore capable of transferring data in parallel between the FPGA arithmetic circuits 14 if the FPGA cache 15-1 has sufficient empty areas. In FIG. 27, however, the transmitting circuits 16A, 16B, and 16C are sequentially connected, and thus exclusive control may be performed to operate only one of the transmitting circuits 16A, 16B, and 16C. Similarly, the receiving circuits 17A, 17B, and 17C are sequentially connected, and thus exclusive control may be performed to operate only one of the receiving circuits 17A, 17B, and 17C.

If the transmission line exemplified by QPI has a sufficient number of lanes, therefore, it is possible to execute parallel transfer data with two groups, that is, pairs of FPGA arithmetic circuits 14 obtained by dividing the FPGA arithmetic circuits 14-1 to 14-4 into two groups. As described above, the FPGA arithmetic circuits 14 performing the data transfer are not limited to a pair of FPGA arithmetic circuits 14, as illustrated in FIG. 27. That is, the number of the FPGA arithmetic circuits 14 performing the data transfer may be any number equal to or greater than 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
 a first arithmetic package including
  a first arithmetic circuit, and
  a second arithmetic circuit; and
 a second arithmetic package coupled to the first arithmetic unit and including
  a third arithmetic circuit, and
  a fourth arithmetic circuit,
 wherein the first arithmetic package further includes
 a first cache memory configured to hold data input to and output from the second arithmetic circuit in accordance with a procedure of maintaining consistency between the data input to and output from the second arithmetic circuit and data stored in a circuit other than the second arithmetic circuit,
 a transmitting circuit configured to transmit, to the second arithmetic package, information indicating start of transmission of transmission data from the second arithmetic circuit to the fourth arithmetic circuit,
 a cache managing circuit configured to write the transmission data to the first cache memory and to restrict use of the first cache memory by data other than the transmission data, and
 wherein the second arithmetic package further includes
 a second cache memory configured to hold data input to and output from the fourth arithmetic circuit in accordance with a procedure of maintaining consistency between the data input to and output from the fourth arithmetic circuit and data stored in a circuit other than the fourth arithmetic circuit, and
 a polling circuit configured to read the transmission data via the second cache memory when the second arithmetic package receives the information indicating the start of the transmission.

2. The information processing device according to claim 1, wherein the cache managing circuit is further configured to detect an empty area for holding the transmission data in the first cache memory, and after presence of the empty area is detected, to determine whether data to be written to the first cache memory is the transmission data based on an address specified in a memory accessible by the first arithmetic package and the second arithmetic package, and to restrict the use of the first cache memory for the data other than the transmission data.

3. The information processing device according to claim 2, wherein the first arithmetic package further includes a controller configured to repeatedly execute a process of acquiring a data amount of the transmission data, and when the presence of the empty area is detected and a capacity of the detected empty area is less than the data amount, causing the cache managing circuit to write the transmission data to the empty area by an amount corresponding to the capacity of the empty area.

4. The information processing device according to claim 2, wherein when a cache miss occurs when the polling circuit reads the transmission data from the second cache memory based on the address specified in the memory, the polling circuit executes again the reading of the transmission data from the second cache memory.

5. The information processing device according to claim 3, wherein the first cache memory includes a cache controller configured to, when the transmission data written to the empty area is read by the polling circuit via the second cache memory, invalidate the empty area for the written transmission data.

6. The information processing device according to claim 2, wherein the transmitting circuit writes the information indicating the start of the transmission to the memory via the first cache memory, and
 wherein the second arithmetic package includes a receiving control circuit configured to read the information indicating the start of the transmission from the memory via the second cache memory.

7. The information processing device according to claim 2, further comprising a transmission line configured to connect both the first arithmetic circuit of the first arithmetic package and the third arithmetic circuit of the second arithmetic package to both the second arithmetic circuit of the first arithmetic package and the fourth arithmetic circuit of the second arithmetic package,
 wherein the transmitting circuit writes the information indicating the start of the transmission to the memory via the first cache memory, and wherein the first arithmetic circuit of the first arithmetic package or the third arithmetic circuit of the second arithmetic package reads the information indicating the start of the transmission from the memory, and delivers the information indicating the start of the transmission to the fourth arithmetic circuit via the transmission line.

8. The information processing device according to claim 1, wherein the cache managing circuit restricts the use of the first cache memory after the transmission data is written to the first cache memory, and cancels the restriction of the use of the first cache memory after the transmission data is read by the polling circuit.

9. The information processing device according to claim 1, wherein the first arithmetic package further includes a controller configured to acquire a data amount of the transmission data, and transfer the transmission data having the data amount to the second arithmetic package via the first cache memory in units of a predetermined write amount.

10. The information processing device according to claim 9, wherein the controller specifies in the memory the predetermined write amount of the transmission data to be written to the first cache memory, writes the transmission data to the first cache memory by the predetermined write amount, restricts the use of the first cache memory, detects completion of reading of the transmission data in the second arithmetic package, and cancels the restriction of the use of the first cache memory after the completion of the reading is detected.

11. A computer-implemented information processing method comprising:
storing, within a first arithmetic package including a first arithmetic circuit and a second arithmetic circuit, data input to and output from the second arithmetic circuit in accordance with a procedure of maintaining consistency between the data input to and output from the second arithmetic circuit and data stored in circuits other than the second arithmetic circuit;
transmitting, to a second arithmetic package, information indicating start of transmission of transmission data from the second arithmetic circuit to a fourth arithmetic circuit of the second arithmetic package;
writing the transmission data to a first cache memory;
restricting use of the first cache memory by data other than the transmission data; and
storing, within the second arithmetic package including a third arithmetic circuit and the forth arithmetic circuit, data input to and output from the fourth arithmetic circuit in accordance with a procedure of maintaining consistency between the data input to and output from the fourth arithmetic circuit and data stored in circuits other than the fourth arithmetic circuit; and
reading, with the second arithmetic package, the transmission data via a second cache memory when the second arithmetic package receives the information indicating the start of the transmission.

12. An information processing device comprising:
a first package including a first arithmetic circuit, first cache memory and a transmitting circuit; and
second package including a second arithmetic circuit, second cache memory and a receiving circuit, wherein
the first arithmetic circuit is configured to provide transfer data to the first cache memory that is destined for the second cache memory;
the transmitting circuit configured to transmit to the receiving circuit an indication of a data transfer of the transfer data and to restrict use of the first cache memory for data other than the transfer data during the data transfer; and
the receiving circuit configured to receive the indication of the data transfer, to acquire the transfer data stored in the first cache memory and to store the acquired transfer data in the second cache memory.

13. The information processing device according to claim 12, further comprising:
at least one central processing unit (CPU);
at least one memory coupled to the at least one CPU;
each of the at least one CPU, at least one memory, the first package and the second package are coupled via a transmission line; and
the transfer data transferred between the first package and second package is not stored within the at least one memory during the data transfer.

* * * * *